US 8,160,402 B2

(12) United States Patent
Wu et al.

(10) Patent No.: US 8,160,402 B2
(45) Date of Patent: Apr. 17, 2012

(54) DOCUMENT IMAGE PROCESSING APPARATUS

(75) Inventors: Bo Wu, Shanghai (CN); Jianjun Dou, Shanghai (CN); Ning Le, Shanghai (CN); Yadong Wu, Shanghai (CN); Jing Jia, Shanghai (CN)

(73) Assignee: Sharp Kabushiki Kaisha, Osaka (JP)

( * ) Notice: Subject to any disclaimer, the term of this patent is extended or adjusted under 35 U.S.C. 154(b) by 1134 days.

(21) Appl. No.: 11/972,477

(22) Filed: Jan. 10, 2008

(65) Prior Publication Data

US 2009/0028445 A1    Jan. 29, 2009

(30) Foreign Application Priority Data

Jul. 23, 2007  (CN) .......................... 2007 1 0129607

(51) Int. Cl.
  *G06K 9/03*   (2006.01)
  *G06K 9/18*   (2006.01)
(52) U.S. Cl. .................. 382/309; 382/185; 382/229
(58) Field of Classification Search .................. None
  See application file for complete search history.

(56) References Cited

U.S. PATENT DOCUMENTS

| | | | | | |
|---|---|---|---|---|---|
| 4,985,863 | A | * | 1/1991 | Fujisawa et al. | 1/1 |
| 5,642,435 | A | * | 6/1997 | Loris | 382/229 |
| 5,768,451 | A | * | 6/1998 | Hisamitsu et al. | 382/309 |
| 5,821,929 | A | | 10/1998 | Shimizu et al. | |
| 5,943,443 | A | | 8/1999 | Itonori et al. | |
| 5,999,647 | A | * | 12/1999 | Nakao et al. | 382/187 |
| 6,463,428 | B1 | | 10/2002 | Lee et al. | |
| 2003/0123732 | A1 | | 7/2003 | Miyazaki et al. | |

FOREIGN PATENT DOCUMENTS

| | | | |
|---|---|---|---|
| CN | 1402854 | A | 3/2003 |
| CN | 1535430 | A | 10/2004 |
| CN | 1851713 | A | 10/2006 |
| JP | 2-56688 | A | 2/1990 |
| JP | 2-242391 | A | 9/1990 |
| JP | 7-152774 | A | 6/1995 |
| JP | 8-153110 | A | 6/1996 |

(Continued)

OTHER PUBLICATIONS

Lee et al. (Oct. 1993) "A Markov language model in Chinese text recognition." Proc. 2nd Int'l Conf. on Document Analysis and Recognition, pp. 72-75.*

(Continued)

*Primary Examiner* — Bhavesh Mehta
*Assistant Examiner* — Barry Drennan
(74) *Attorney, Agent, or Firm* — Birch, Stewart, Kolasch & Birch, LLP

(57) ABSTRACT

An image of a character string composed of M pieces of characters is clipped from a document image, and the image is divided character by character, and image features of each character image are extracted. On the basis of the image features, N (N>1, integer) pieces of character images in descending order of degree of similarity are selected as candidate characters from a character image feature dictionary which stores the image features of character image in units of character, and the first index matrix of M×N cells is prepared. A candidate character string composed of a plurality of candidate characters constituting the first column of the first index matrix, is subjected to a lexical analysis according to a predetermined language model, whereby a second index matrix adjusted into a character string which makes sense is prepared to be utilized for searching.

3 Claims, 26 Drawing Sheets

FOREIGN PATENT DOCUMENTS

| | | | |
|---|---|---|---|
| JP | 9-245126 | A | 9/1997 |
| JP | 9-319747 | A | 12/1997 |
| JP | 10-74250 | A | 3/1998 |
| JP | 11-66236 | A | 3/1999 |
| JP | 11-328309 | A | 11/1999 |
| JP | 2000-181994 | A | 6/2000 |
| JP | 2002-24765 | A | 1/2002 |
| WO | WO-01/40987 | A1 | 6/2001 |

OTHER PUBLICATIONS

Lee et al. (Aug. 1997) "A language model based on semantically clustered words in a Chinese character recognition system." Pattern Recognition, vol. 30 No. 8, pp. 1339-1346.*

* cited by examiner

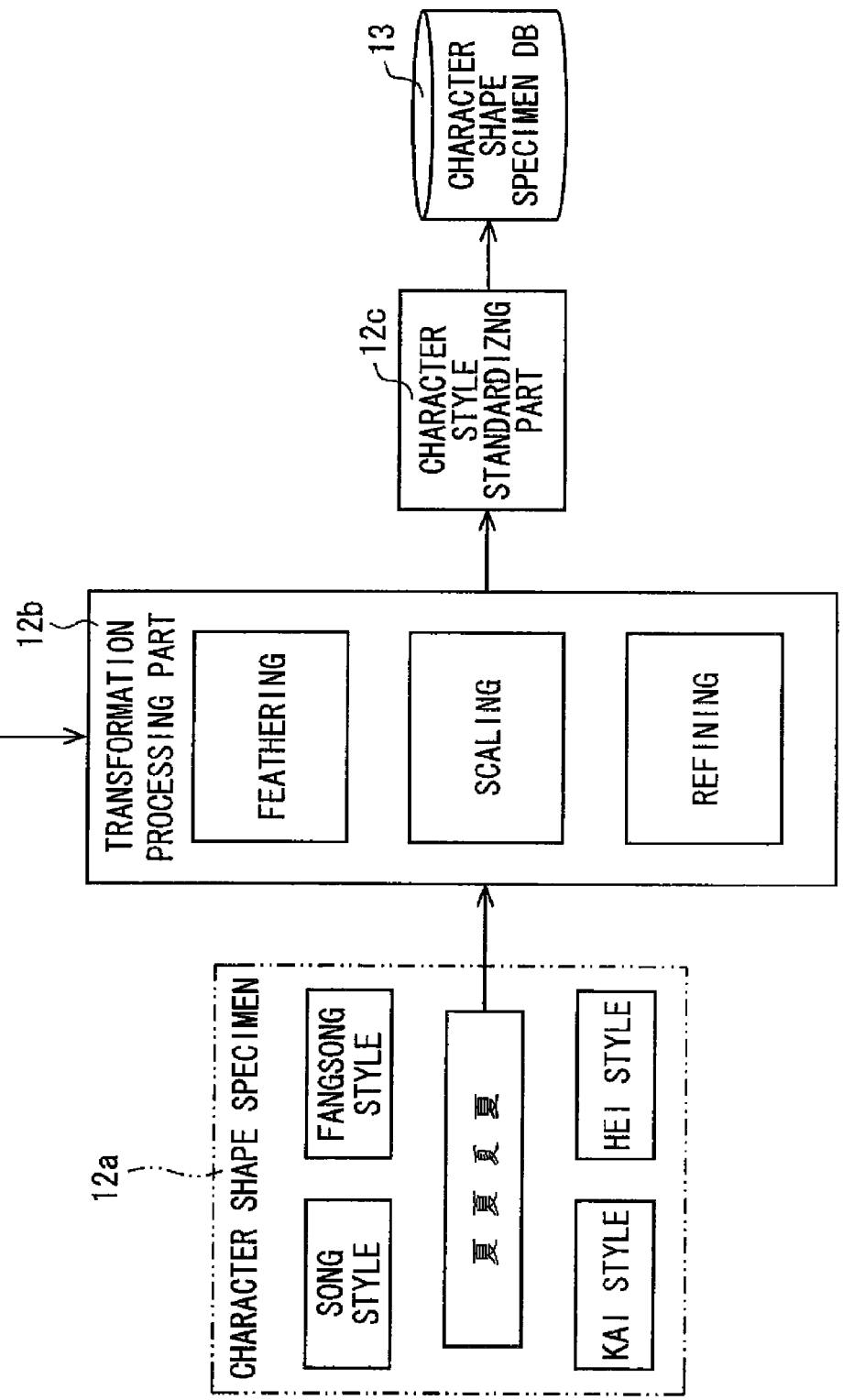

FIG. 14

| Initials | Num of Co-occurrence word | Co-occurrence word | Frequency | Character num of words |
|---|---|---|---|---|
| 啊 | 5 | 阿 | 1 | 2 |
|  |  | 草 | 2 | 2 |
|  |  | 地 | 1 | 2 |
|  |  | 还 | 3 | 2 |
|  |  | 填 | 1 | 2 |
| 阿 | 123 | 巴 | 9 | 2 |
|  |  | 北 | 3 | 2 |

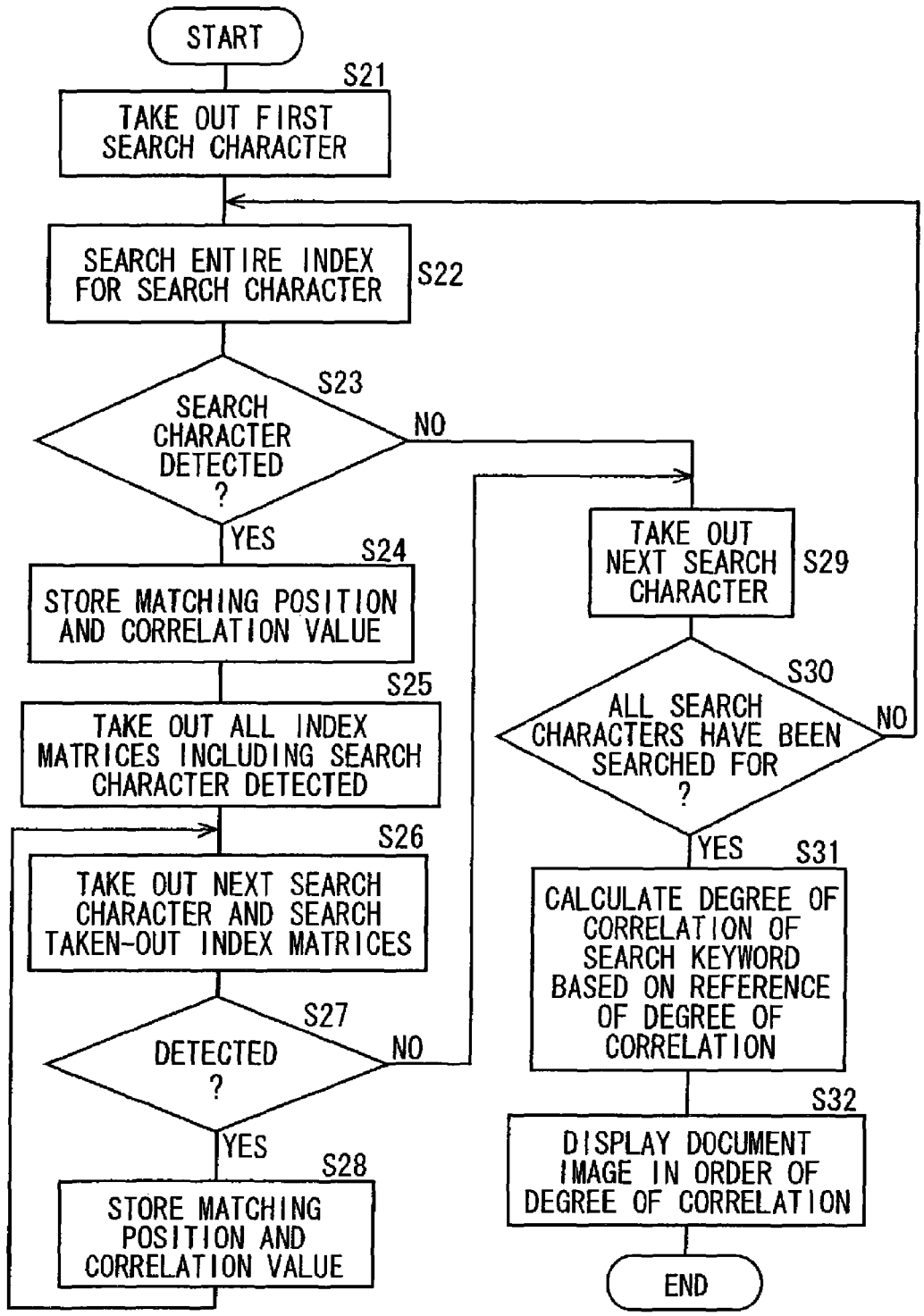

FIG. 18

IF:
- SEARCH KEYWORD INCLUDES R PIECES OF CHARACTERS: C1, C2, ···, Cr;
- INDEX MATRIX HAS M×N CELLS, CORRELATION VALUE MATRIX "Weight" HAS M×N CELLS, AND Weight[i][j] REPRESENTS CORRELATION VALUE WHEN CHARACTER AT Index[i][j] IS IN SIMILARITY;
- DEGREE-OF-CORRELATION WEIGHTING FACTOR FOR ROWS IS REPRESENTED BY A SYMBOL Q; AND
- CORRELATION VALUES ARE REPRESENTED BY W1, W2, ···, Wr WHEN CHARACTER IS IN SIMILARITY.

101

+

IF:
RESPECTIVE CHARACTERS C1, C2, ···, Cr, ARE MATCHED AT [C1i, C1j], [C2i, C2j], ···, [Cri, Crj] IN INDEX MATRIX;
AND
$C(k+1)i = Cki+1$, $C(m+1)i = Cmi+1 \ (m>k)$     ...(1)

102

=

THEN:
- DEGREE OF CORRELATION BETWEEN SEARCH KEY WORD AND INDEX MATRIX IS EXPRESSED BY:
SimDegree = W1+W2+···+W(k-1)+Q*(Wk+W(k+1))+···+W(m-1)+Q*(Wm+W(m+1))+···+Wr   ...(2)
WHERE W1=Weight[C1i][C1j], W2=Weight[C2i][C2j], ···, Wr=Weight[Cri][Crj]

FOR EXAMPLE,
- CORRELATION VALUE MATRIX "Weight" HAS M×N CELLS;
- Weight[i]=[1, 1-1/N, 1-2/N, ···, 1/N] (i=0, 1, ···, M-1);
  AND
- DEGREE-OF-CORRELATION WEIGHTING FACTOR FOR ROWS Q IS SET.

↓ "神仙"

105

RESULT:
CORRELATION VALUE OF "神" IS (1)
CORRELATION VALUE OF "仙" IS (1)

↓ WEIGHT ADJUSTMENT

106

RESULT:
DEGREE OF CORRELATION BETWEEN "神仙" AND "KA" IS
DETERMINED BY SimDegree=(1+1)*Q=2Q

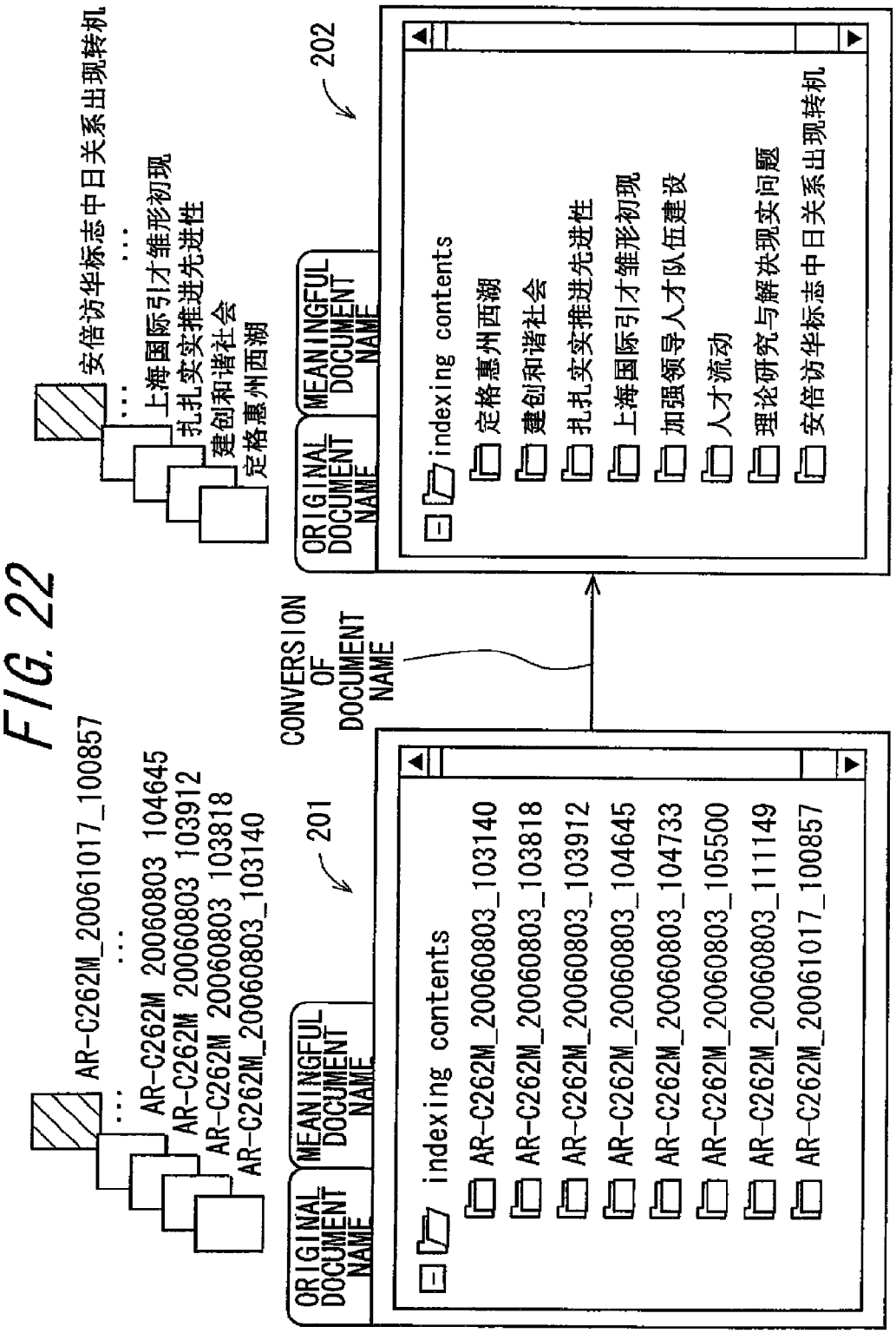

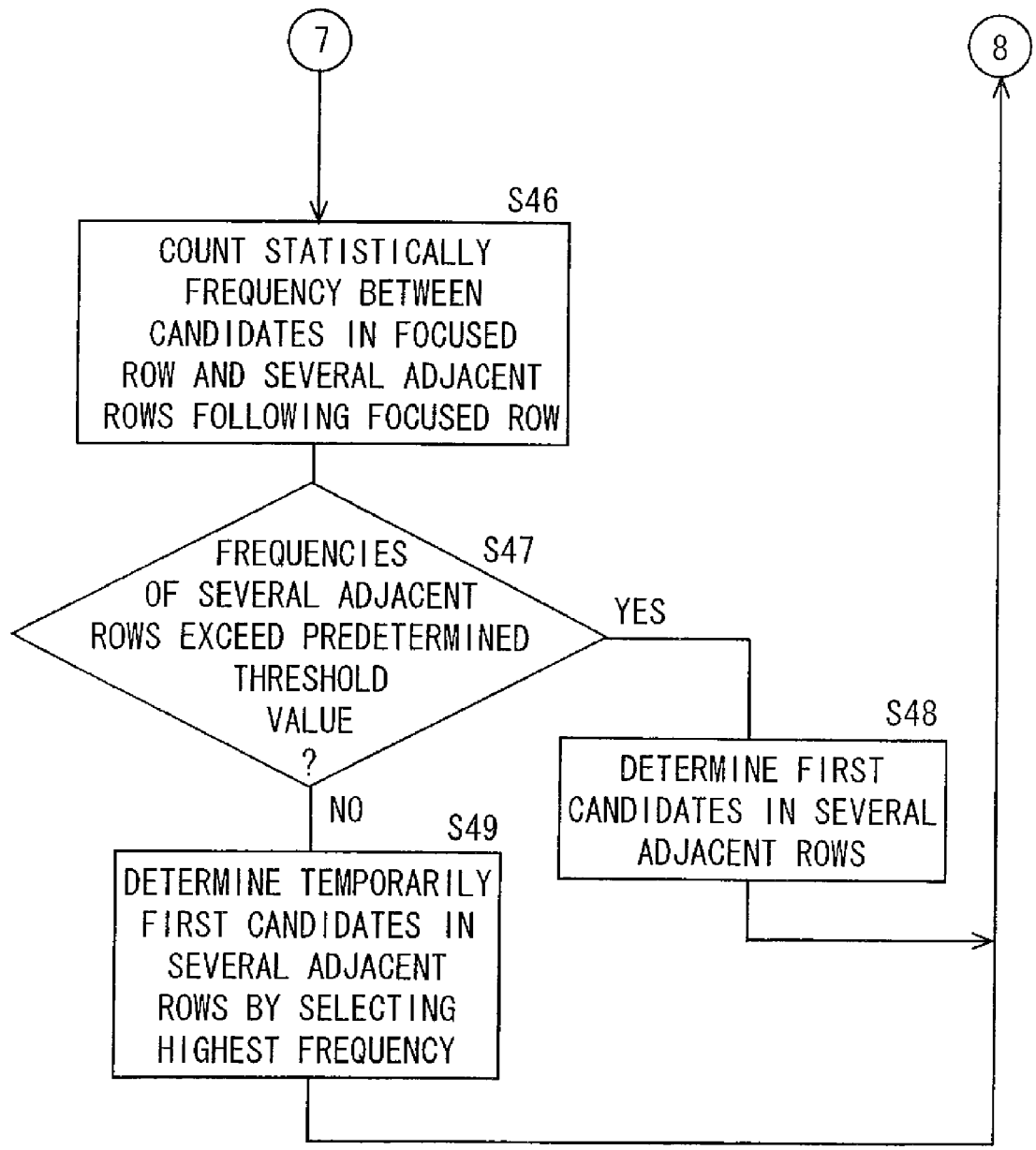

DOCUMENT IMAGE PROCESSING APPARATUS

CROSS-REFERENCE TO RELATED APPLICATION

This application claims priority to Chinese Patent Application No. 200710129607.X, which was filed on Jul. 23, 2007, the contents of which are incorporated herein by reference in its entirety.

BACKGROUND OF THE INVENTION

1. Field of the Invention

The present invention relates to a character image feature dictionary preparation apparatus and a character image feature dictionary preparation program, which input a document as an image and store the images and moreover relates to a recording medium on which the character feature dictionary preparation program is recorded. In particular, the present invention relates to a document image processing apparatus, a document image processing program, and a document image processing program-recorded recording medium, each of which includes a function of searching the stored document image.

2. Description of the Related Art

A document filing apparatus has been in practical use, which utilizes an image inputting device such as an image scanner to convert a document into an image and electronically store the image, and enables searching of the document later on. A technique relating to the document filing apparatus just mentioned has been disclosed in Chinese Unexamined Patent Publications CN1402854A, CN1535430A, and CN1851713A.

To search the document images read out as image data, it is necessary to take work to manually provide index information for searching, to the respective document images. Consequently, this requires enormous labor.

In addition, an apparatus has also been proposed, which locates a character region (a text region) of document image, performs optical character reader (OCR) recognition, and enables a full-text search according to the text content. The related art using the OCR recognition includes, for example, the technique disclosed in Japanese Unexamined Patent Publication JP-A 7-152774 (1995).

However, it problematically requires considerable calculation and thus a long time to achieve the OCR recognition. Moreover, a low recognition rate may lead to false recognition which causes a failure in searching for the target character. Accordingly, the OCR recognition has a problem in search precision.

Meanwhile, Japanese Unexamined Patent Publication c discloses a technique which enables the automatic full-text search without using the OCR recognition.

In the constitution of the aforementioned Publication, a category dictionary is prepared in advance, in which characters are classified based on image features into similar character categories for each of the similar characters. And then, at the time of registering a document image, no character recognition is performed on any characters in a text region (a character region) while image features are extracted to be used for classifying the characters into character categories, and the category series recognized for respective characters are stored together with the inputted images. At the time of searching, the respective characters in a search keyword are converted into corresponding categories, and document images partially containing the converted category series are taken out as a search result.

And then, as an effect of the constitution, it is described that the constitution can provide a document filing which enables high-speed processing with low computational power for registering documents and which can realize a low rate of incomplete search in searching for the target character.

Various feature-extracting methods have been proposed for preparing a dictionary based on the image features and for extracting the image features of each of characters from the document images.

In these feature-extracting methods, the feature can be sufficiently extracted in some cases but not in other cases depending on a type of targeted character. There is thus a problem that a selection of the extracting method may lead to insufficient creation of the dictionary and insufficient feature-extraction of the document image which result in a failure to obtain sufficient search precision in text-searching.

SUMMARY OF THE INVENTION

An object of the invention is to provide a character feature dictionary preparation apparatus, a document image processing apparatus having the character feature dictionary preparation apparatus, a character image feature dictionary preparation program, a character image feature dictionary preparation program-recorded recording medium, a document image processing program, and a document image processing program-recorded recording medium, each of which is higher in search precision by improving a character feature-extracting method.

The invention provides a character image feature dictionary preparation apparatus comprising:

an extracting portion for extracting image features of a character image in units of character according to a plurality of feature-extracting methods;

a calculating portion for converting into vectors the image features extracted by the respective feature-extracting methods and calculating a resultant vector by synthesizing a plurality of feature vectors for the respective feature-extracting methods; and a storing portion for storing a calculated resultant vector as an image feature in units of character.

According to the invention, the extracting portion extracts image features of a character image in units of character according to a plurality of the feature-extracting methods. The calculating portion converts into vectors the image features extracted by the respective feature-extracting methods, and calculates a resultant vector by synthesizing the feature vectors for the respective feature-extracting methods. In the storing portion, the calculated resultant vector is stored as an image feature in units of character.

This makes it possible to store the image features based on a plurality of the feature-extracting methods, with the result that the use of a prepared character image feature dictionary in searching enables to enhance the search precision.

Further, in the invention, it is preferable that the calculating portion calculates the resultant vector by weighting the feature vectors for the respective feature-extracting methods based on weights determined for the respective feature-extracting methods and synthesizing weighted feature vectors.

According to the invention, the calculating portion calculates the resultant vector by weighting the feature vectors for the respective feature-extracting methods based on weights determined for the respective feature-extracting methods and synthesizing the weighted feature vectors.

The weighting allows for calculation of the resultant vector in which the feature vectors obtained based on a plurality of the feature-extracting methods are synthesized in the optimum proportion.

Further, in the invention, it is preferable that the calculating portion sets the weights according to respective font types of the character image, calculates resultant vectors for the respective font types, and determines one representative vector from among the resultant vectors for the respective font types, and the storing portion stores the determined representative vector as an image feature.

According to the invention, the calculating portion sets the weights according to respective font types of a character image, and calculates the resultant vectors for the respective font types. Furthermore, among the resultant vectors calculated for the respective font types, one representative vector is determined and stored as an image feature.

This makes it possible to further enhance the search precision regardless of font types of a character to be searched for.

Further, in the invention, it is preferable that the calculating portion determines the representative vector according to a learning vector quantization method.

According to the invention, the calculating portion can determine the representative vector according to a learning vector quantization method.

Further, in the invention, it is preferable that the plurality of the feature-extracting methods are a character image peripheral feature-extracting method, a grid-direction-wise feature-extracting method, and a distribution-direction-wise feature-extracting method.

According to the invention, the plurality of the feature-extracting methods may include a character image peripheral feature-extracting method, a grid-direction-wise feature-extracting method, and a distribution-direction-wise feature-extracting method.

Further, the invention provides a document image processing apparatus comprising:

a character image feature dictionary prepared by the character image feature dictionary preparation apparatus mentioned above;

a character string clipping portion for clipping character images in units of character string composed of a plurality of characters from an inputted document image;

an image feature extracting portion for dividing the character images in the character string clipped by the character string clipping portion, character by character, and extracting an image feature of the divided respective character images, as the resultant vector;

a feature similarity measurement portion for selecting N (N>1, integer) pieces of character images in descending order of degree of similarity of image feature as candidate characters, from the character image feature dictionary which stores image features of character images in units of character based on the image features of each of the character images extracted by the image feature extracting portion, preparing a first index matrix of M×N cells where M (M>1, integer) represents a number of characters in the extracted character string, and preparing a second index matrix having a meaningful character string at a first column of the first index matrix, the meaningful character string being formed by adjusting candidate character strings by application of a lexical analysis using a predetermined language model to the candidate character string composed of a plurality of candidate characters constituting the first column of the first index matrix;

an index information storing portion for storing the second index matrix prepared by the feature similarity measurement portion, so as to correspond to the inputted document image; and a searching section for searching, in a searching operation, the index information storing portion in units of search character constituting a search keyword of an inputted search formula, to take out the document image which includes the second index matrix containing the search character.

According to the invention, the image feature extracting portion divides the images of character strings in the document images which are located and clipped by the character string clipping portion, character by character, and extracts image features of each of the character images. And then, on the basis of the image features extracted as the resultant vector of the image features of the character image, the feature similarity measurement portion selects N (N>1, integer) pieces of character images in descending order of degree of similarity of image feature as candidate characters, thus preparing the first index matrix of M×N cells where M (M>1, integer) represents the number of the characters in the clipped character string and N represents the number of the above character images, with use of the resultant vector in the character shape dictionary prepared by the character image feature dictionary preparation apparatus.

Further, the candidate character string which is composed of a plurality of candidate characters constituting the first column of the first index matrix, is subjected to a lexical analysis according to the predetermined language model, to be thereby adjusted into a character string which makes sense. An index having the character string which makes sense is referred to as a second index matrix.

The prepared second index matrix is stored by the index information storing portion so as to correspond to the inputted document image. In the searching operation, the index matrix is used as index information for searching the document image.

By doing so, without troubling a user and without using the OCR recognition, it is possible to automatically locate a character string in a character region of a document image and produce index information of the document image based on image features of the located character string.

In addition, the image feature of each of character images is extracted, and a plurality of candidate characters similar in image feature are selected, with the result that the appropriate setting of the number of the candidate characters to be selected will shorten the length of time necessary for the character recognition which used to require a long time in the OCR recognition, and eliminate incomplete recognition, thus allowing for the precise search.

Further, since a character string that makes sense is inputted as a search keyword, the candidate character string of the second index matrix which makes sense can enhance the search precision.

Further, since the character image feature dictionary stores the image features of character image based on a plurality of the feature-extracting methods and the feature similarity measurement portion divides the image of clipped character string into character images of single characters, an index matrix prepared is of high precision.

At the time of searching, the searching section searches the index information storing portion in units of search character constituting the search keyword of the inputted search formula. Moreover, the searching section takes out a document image which includes the index matrix containing the search characters.

As has been mentioned heretofore, the index matrices are analyzed in units of search character constituting the search keyword, to thereby detect the index matrix containing the search keyword. Consequently, this can ensure an overall search owing to the character-by-character search.

Further, in the invention, it is preferable that the feature similarity measurement portion performs the lexical analysis on the candidate character strings by adopting a bi-gram or multi-gram model as a language model.

Further, according to the invention, the feature similarity measurement portion can adopt a bi-gram or multi-gram model as a language model.

Further, in the invention, it is preferable that the feature similarity measurement portion adjusts, based on the lexical analysis, the candidate character string of the first column in the first index matrix into a meaningful candidate character string by replacing a candidate character in the first column by another candidate character in the same row in which the candidate character exists in the first index matrix.

Further, according to the invention, the feature similarity measurement portion adjusts, based on the lexical analysis, the candidate character string of the first column in the first index matrix into a meaningful candidate character string by replacing a candidate character in the first column by another candidate character in the same row in which the candidate character exists in the first index matrix.

By doing so, the candidate character string can be adjusted at the same degree of similarity as that of the first index matrix.

Further, the invention provides a character image feature dictionary preparation program for causing a computer to function as the character image feature dictionary preparation apparatus.

Further, the invention provides a computer-readable recording medium on which is recorded a character image feature dictionary preparation program for causing a computer to function as the character image feature dictionary preparation apparatus.

According to the invention, it is possible to provide the character image feature dictionary preparation program and the computer-readable recording medium on which the character image feature dictionary preparation program is recorded.

Further, the invention provides a document image processing program for causing a computer to function as the document image processing apparatus.

Further, the invention provides a computer-readable recording medium on which is recorded a document image processing program for causing a computer to function as the document image processing apparatus.

According to the invention, it is possible to provide the document image processing program and the computer-readable recording medium on which the document image processing program is recorded.

BRIEF DESCRIPTION OF THE DRAWINGS

Other and further objects, features, and advantages of the invention will be more explicit from the following detailed description taken with reference to the drawings wherein:

FIG. 3 is a view showing a process on how a character style normalization processing portion prepares a character shape specimen DB;

FIG. 14 is a view showing a constitution example of dictionary data used in a bi-gram model;

FIG. 17 is a flowchart showing a search procedure in the searching section;

FIG. 18 is an illustration showing a method of calculating a degree of correlation between a search keyword and an index matrix;

FIG. 19 is an illustration showing a specific example on how to calculate the degree of correlation between the search keyword and the index matrix;

FIG. 22 is a view showing one example of browsing screens, displayed by a document image displaying portion, of a document image stored in a document image DB; and FIGS. 23A and 23B are flowcharts showing a method of adjusting the index matrix by using a multi-gram model.

DETAILED DESCRIPTION

Figure 1:
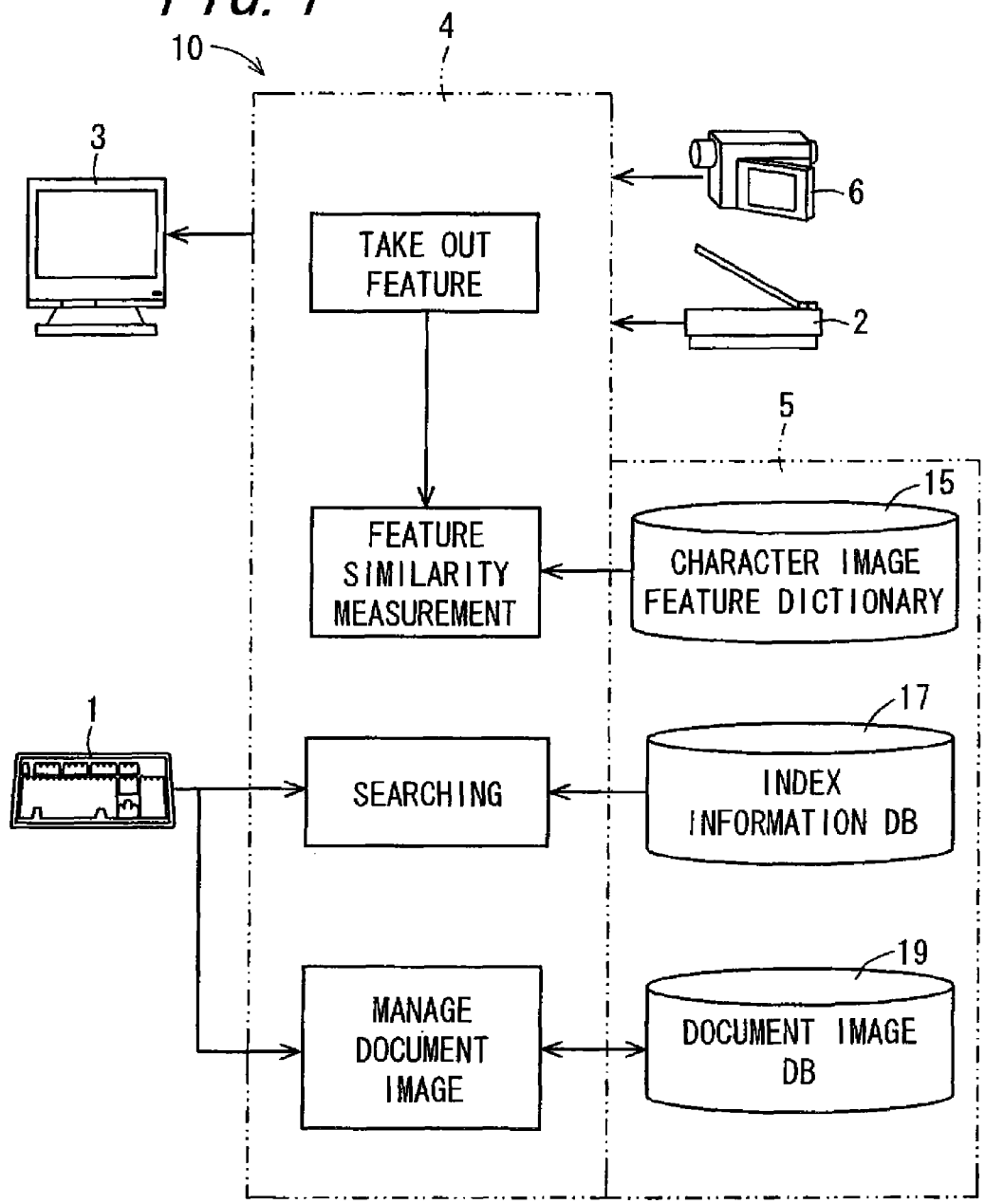
FIG. 1 is a block diagram schematically showing a constitution of a document image processing apparatus.

Now referring to the drawings, preferred embodiments of the invention are described below.

FIG. 1 is a block diagram schematically showing a constitution of the document image processing apparatus 10. The document image processing apparatus 10 includes a processor 4 and an external storage device 5. The external storage device 5 stores software etc. which is used by the processor 4 to perform an actual processing.

The processor 4 performs actually a document image feature extracting process, an index information producing process, a search process, a document image managing process, and the like. In the document image feature extracting process, a search key heading region is clipped from a document image. In the index information producing process, index information is produced that makes it possible to search the document image. The index information is used in the search process. In the document image managing process, a meaningful document name is prepared by use of the index information so as to manage the document image. The meaningful document name will be described later on.

The actual processing of the processor 4 is performed by use of the software stored in the external storage device 5. The processor 4 is constructed of, for example, a main body of a common computer. In the present embodiment, the processor 4 is so provided as also to be able to perform a character image feature dictionary preparing process. In the character image feature dictionary preparing process, a character image feature dictionary 15 is prepared which is used in the index information producing process and will be described later on.

The external storage device 5 can be constructed of, for example, a fast accessible hard disk. For the sake of holding a large quantity of document images, it is acceptable that the external storage device 5 is constructed of a high-capacity device such as an optical disc. The external storage device 5 is designed for use in preparing the character image feature dictionary 15, an index information DB (database) 17, a document image DB 19, a character shape specimen DB 13, and the like component, which will be described later on.

A keyboard 1 and a display device 3 are connected simultaneously to the document image processing apparatus 10. The keyboard 1 is used for inputting a search keyword. In addition, the keyboard 1 is also used for inputting an instruction at the time of browsing a document image. Further, the keyboard 1 is also used for modifying set values, such as the number of candidate characters, a correlation value, and a degree-of-correlation weighting factor for rows Q, which will be described later on. The display apparatus 3 outputs and thereby displays the document image, etc. The content displayed by the display device 3 includes degree-of-correlation information, an image name, and the like information.

An image scanner 2 or a digital camera 6 is further connected to the document image processing apparatus 10. The image scanner 2 and the digital camera 6 are used for acquiring the document image. A way to acquire the document image is, however, not limited to the way where the image scanner 2 or the digital camera 6 is used. The acquirement of the document image may be realized by communication across a network, and the like. In addition, the image scanner 2 or the digital camera 6 may be used to input the search keyword.

Figure 2A:
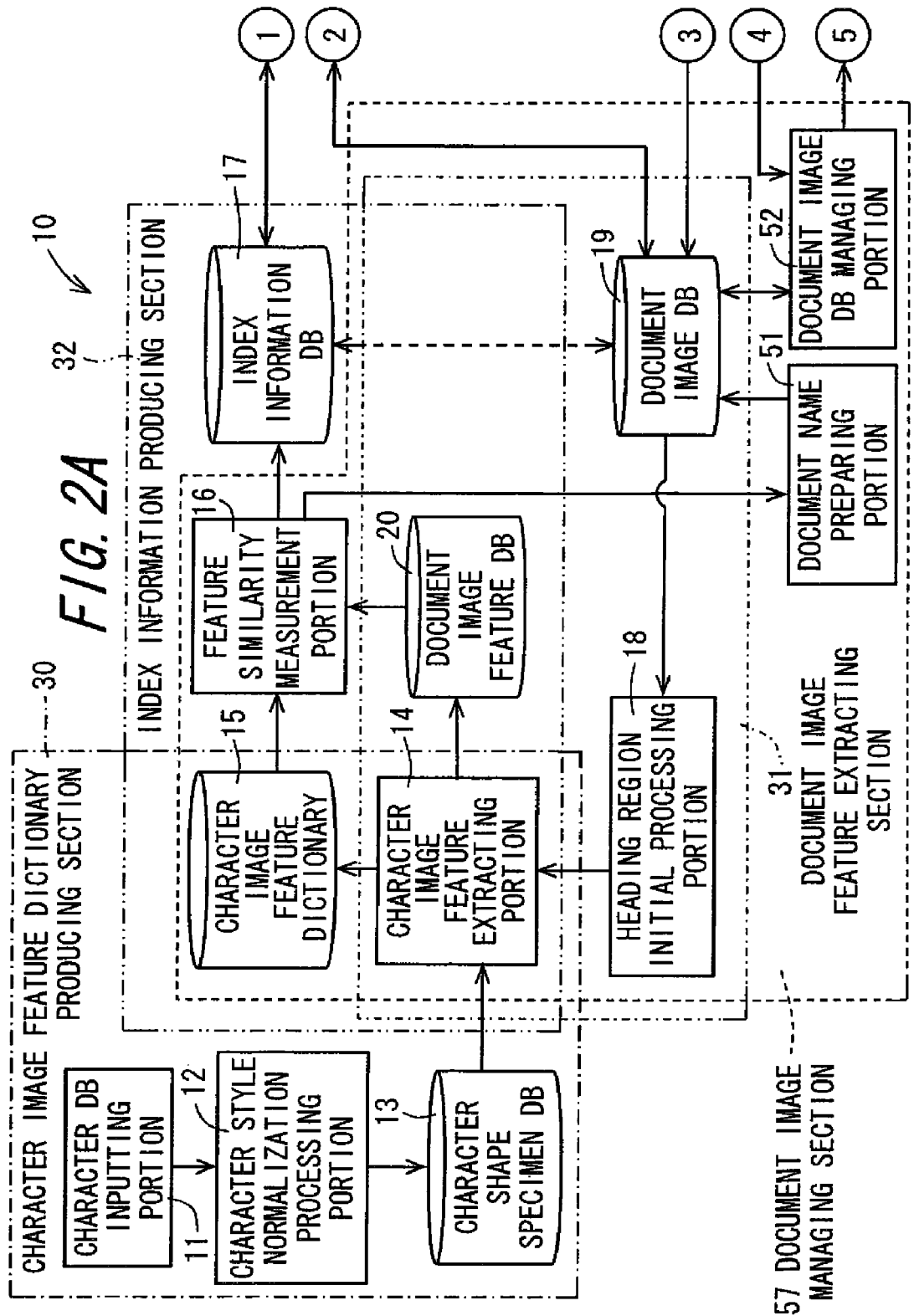
FIGS. 2A and 2B are block diagrams showing in detail the constitution of the document image processing apparatus.
Figure 2B:
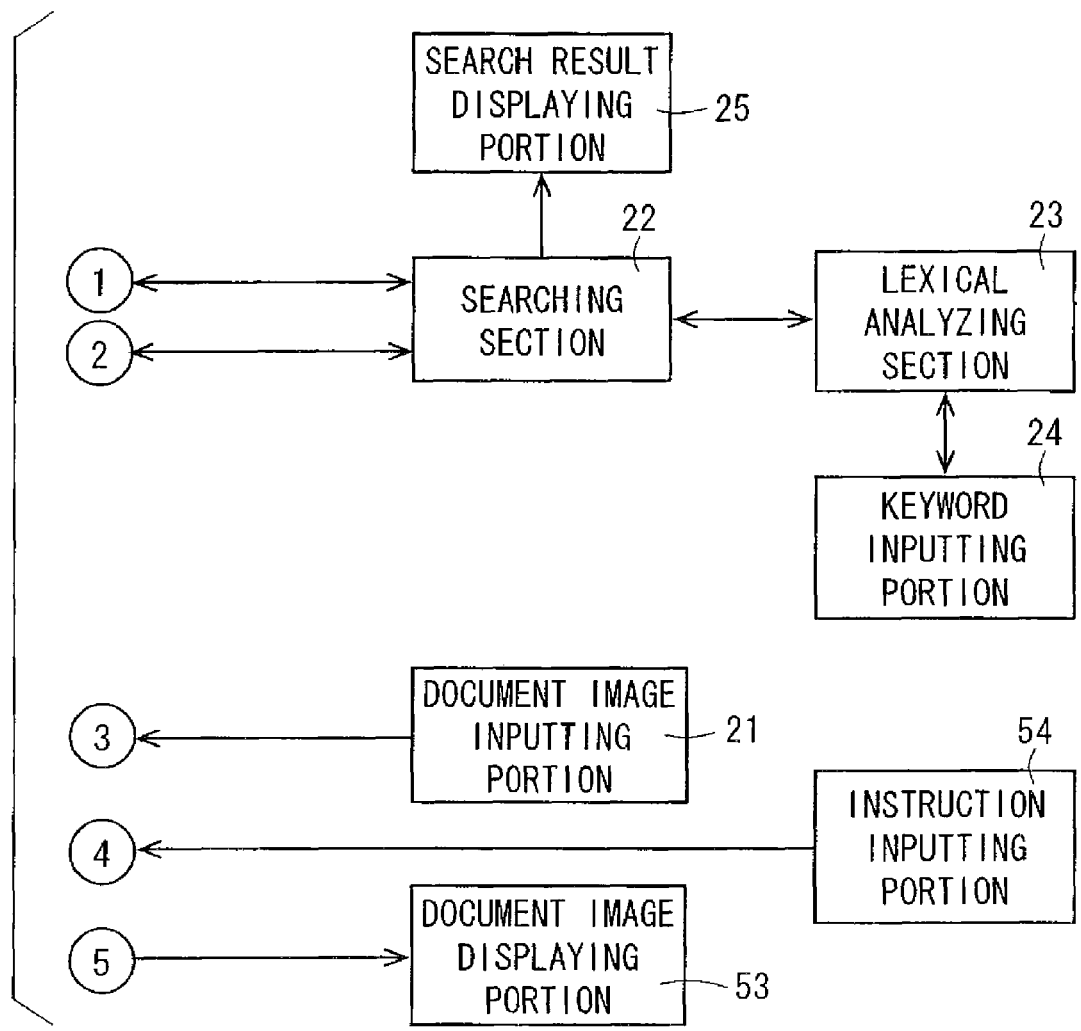

FIGS. 2A and 2B are block diagrams showing in detail the constitution of the document image processing apparatus 10. The document image processing apparatus 10 includes a character database inputting portion (character DB inputting portion) 11, a character style normalization processing portion 12, the character shape specimen DB 13, a character image feature extracting portion (image feature extracting portion) 14, the character image feature dictionary 15, a feature similarity measurement portion 16, the index information DB 17, a heading region initial processing portion 18, the document image DB 19, a document image feature database (document image feature DB) 20, a document image inputting portion 21, a searching section 22, a lexical analyzing section 23, a keyword inputting portion 24, a search result displaying portion 25, a document name preparing portion 51, a document image DB managing portion 52, a document image displaying portion 53, and an instruction inputting portion 54.

Among the components listed above, the character DB inputting portion 11, the character style normalization processing portion 12, the character shape specimen DB 13, the character image feature extracting portion 14, and the character image feature dictionary 15 constitute a character image feature dictionary producing section 30 which performs the aforementioned character image feature dictionary preparing process.

Firstly, descriptions are given to the character DB inputting portion 11, the character style normalization processing portion 12, the character shape specimen DB 13, the character image feature extracting portion 14, and the character image feature dictionary 15 which constitute the character image feature dictionary producing section 30.

The character DB inputting portion 11 is used for inputting a fundamental character database which is necessary for preparing the character image feature dictionary 15. When the present apparatus is adaptable to, for example, Chinese, 6763 characters in the GB2312 of People's Republic of China, and the like element are all inputted to the character DB inputting portion 11. In addition, when the present apparatus is adaptable to Japanese, approximately 3000 characters of JIS level-1, and the like element are inputted to the character DB inputting portion 11. That is to say, the characters mentioned herein include symbols. The character DB inputting portion 11 as has been described heretofore is constructed by the processor 4. The character database is provided via a recording medium or across a network, or the like.

The character style normalization portion 12 is designed to prepare character images different in font and size, of all the characters included in the character database inputted by the character DB inputting portion 11. The character images different in font and size are stored in the character shape specimen DB 13.

FIG. 3 shows a process on how the character style normalization processing portion 12 prepares the character shape specimen DB 13. When the present apparatus is adaptable to Chinese, the character style normalization processing portion 12 is provided with, for example, a character shape specimen 12a such as Song style, Fangsong style, Hei style, and Kai style. In addition, when the present apparatus is adaptable to Japanese, the character style normalization processing portion 12 is provided with, for example, a character shape specimen such as Ming-cho style and Gothic style.

The character style normalization processing portion 12 includes a character shape specimen 12a, a transformation processing part 12b, and a character style standardizing part 12c. The transformation processing part 12b images the characters in the character database and standardizes resulting character images. Next, in reference to the character shape specimen 12a, the transformation processing part 12b performs a transformation process on the standardized character images and further prepares character images different in font and size. The transformation process includes a feathering process, a scaling process, and a refining process. The character images already treated with the transformation process as mentioned above are brought by the character style standardizing part 12c to the character shape specimen DB 13 where the character images are then stored as reference character images.

In the character shape specimen DB 13, the reference character images of all the characters in the character database are stored in units of the character shape which is defined by font and size even for one identical character. To cite a case, even for one character "中" in the character type, the character shape specimen DB 13 stores as many the reference character images "中" different in shape as the predetermined number of the font. In addition, the character shape specimen DB 13 also stores as many the reference character images "中" different in size as the predetermined number of the size.

The character image feature extracting portion 14 extracts features of character image (abbreviated as the "image features") and stores the extracted features in the character image feature dictionary 15 where the extracted features are then stored. In the present embodiment, the character image feature extracting portion 14 extracts the features of character image by combining character image peripheral features (so-called "image PBA"), grid-direction-wise features (so-called "grid features"), and direction-wise features (so-called "global DCD"), and then calculates feature vectors whose elements are the above features obtained respectively in three methods. In the invention, it is preferable that the three features are employed and therefore, the feature vectors have three-dimensional vectors. Note that the features of character image are not limited to the feature just described, and other features may be extracted to be feature vectors.

Figure 4:
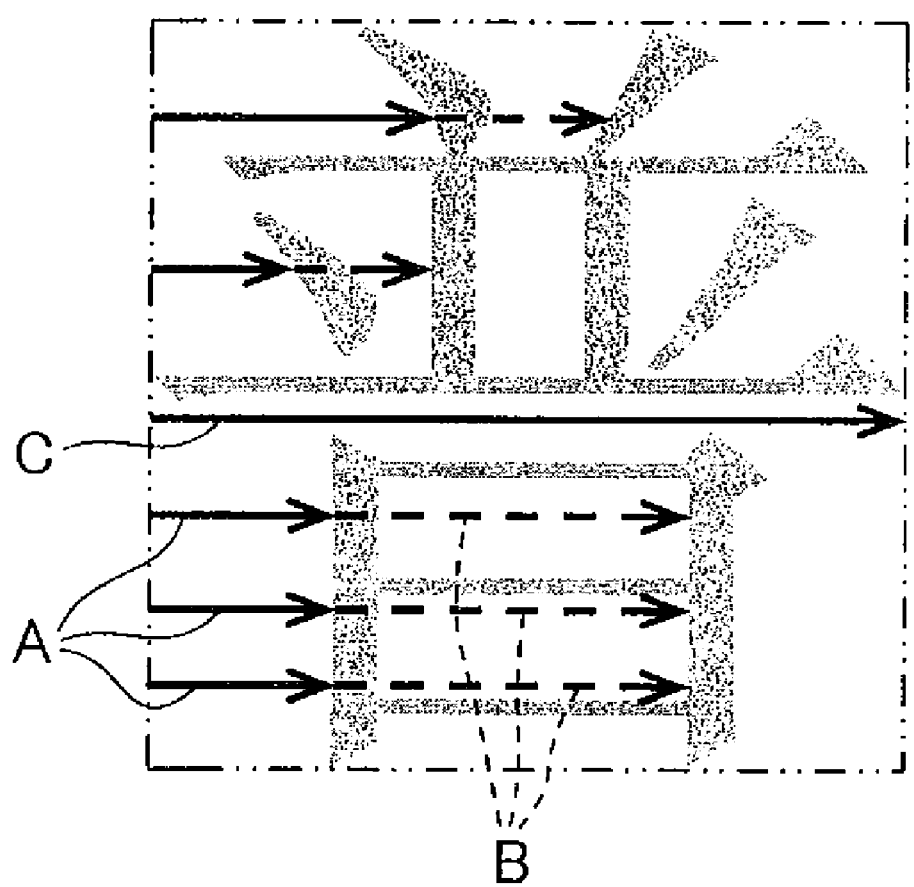
FIG. 4 is an illustration of a character image peripheral feature.

Here, descriptions will be given to the character image peripheral features, the grid-direction-wise features, and the distribution-direction-wise features. FIG. 4 is an illustration of the character image peripheral features. The character image peripheral features refer to outline features viewed from without. As shown in FIG. 4, scanning from four sides of a circumscribing rectangle of the character image, a distance from the four sides thereof to a border point between a white pixel to a black pixel is defined as a feature. A position of the first change of the pixel color and a position of the second change of the pixel color are taken out.

For example, the circumscribing rectangle is divided into X rows and Y columns. In this case, the image is subjected to leftward scanning and rightward scanning respectively row by row and is subjected to upward scanning and downward scanning respectively column by column. Note that FIG. 4 shows a diagram where the image is subjected to leftward scanning row by row.

In FIG. 4, a solid arrow A indicates a scanning path to the point of the first change of pixel color from white to black. A dashed arrow B indicates a scanning path extending to the point of the second change of pixel color from white to black. A solid arrow C indicates a scanning path through which no points of pixel color change from white to black are detected. In this case, the distance value is zero.

Figure 5A:
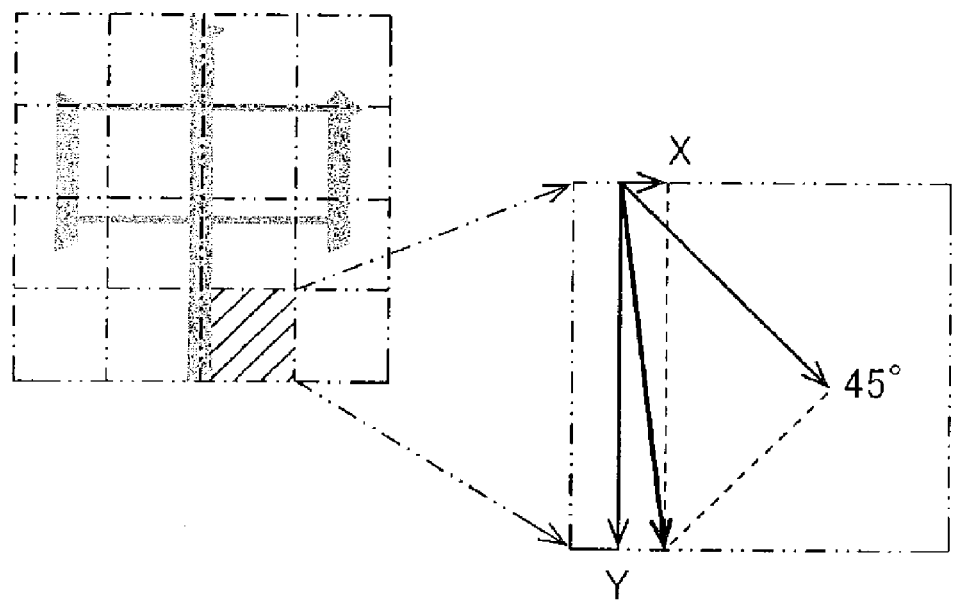
FIGS. 5A and 5B are illustrations of grid-direction-wise features.
Figure 5B:
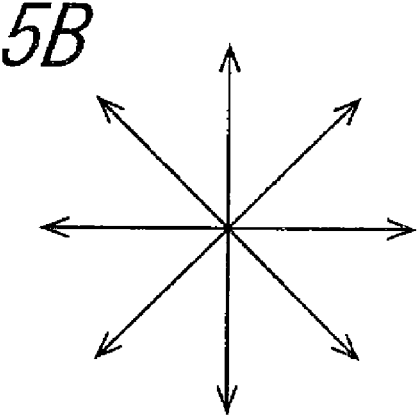

FIGS. 5A and 5B are illustrations of the grid-direction-wise features. A character image is divided in a rough grid pattern. An attempt is made in a plurality of predetermined directions to detect black pixels in the respective grids. A number of black pixels which are connected in each of the directions is counted, and direction contributing degrees which represent a distribution state of the black pixels with respect to each of the direction components thereof is calculated by dividing distance values by a value corresponding to a difference in number of black pixels using Euclidean distance as a discrimination function.

In FIG. 5A, the character image is divided into 16 grids in a 4×4 grid pattern, and black pixels are attempted to be detected in three directions of X-axis direction (0°), a 45-degree direction, and a Y-axis direction (90°) from a center point, i.e., a point of change of pixel color form black to white, which point is located at the shortest distance in the X-axis direction from a grid intersection.

In the present embodiment, the character image is divided in an 8×8 square mesh pattern. As shown in FIG. 5B, black pixels are attempted to be detected in eight directions, namely, a 0-degree direction, a 45-degree direction, a 90-degree direction, a 135-degree direction, a 180-degree direction, a 225-degree direction, a 270-degree direction, and a 315-degree direction.

Note that grid-direction-wise feature extracting methods may be various with different directions in which black pixels are attempted to be detected or with different positions of the center point about which black pixels are attempted to be detected. For example, refer to the descriptions in Japanese Unexamined Patent Publication JP-A 2000-181994.

Figure 6:
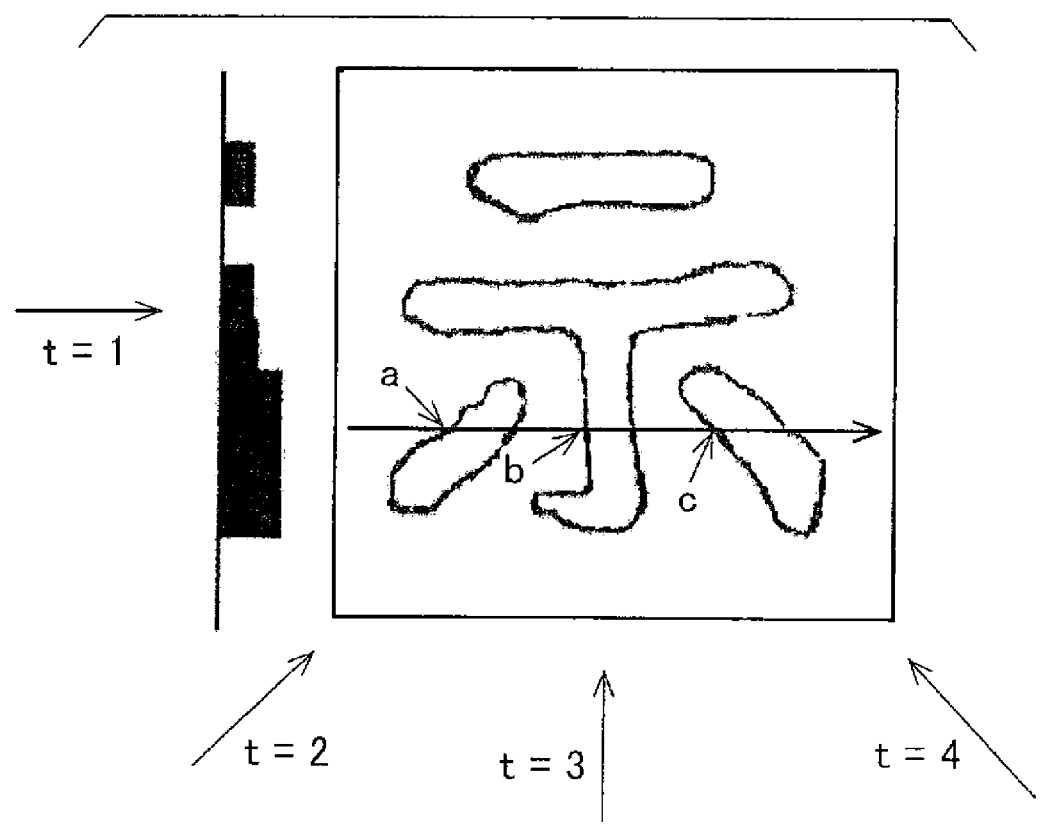
FIG. 6 is an illustration of a distribution-direction-wise feature.

FIG. 6 is an illustration of the distribution-direction-wise feature. FIG. 6 shows a feature of entire density distribution of the character image when viewed in plural directions, indicating a joint relation of image based on pixels of entire character. For example, as shown in FIG. 6, black pixels in four directions represented by t=1 to 4 are counted to thereby extract as a feature a distribution of the black pixels viewed in four directions, namely, a 0-degree direction, a 45-degree direction, a 90-degree direction, and a 135-degree direction.

The character image feature extracting portion 14 carries out the extraction of feature of character image as just described, on all the reference character images stored in the character shape specimen DB 13. And the character image feature extracting portion 14 stores an extraction result of the reference character image stored in the character shape specimen DB 13 in the character image feature dictionary 15 where the extraction result is then stored, thus producing the character image feature dictionary 15.

Figure 7:
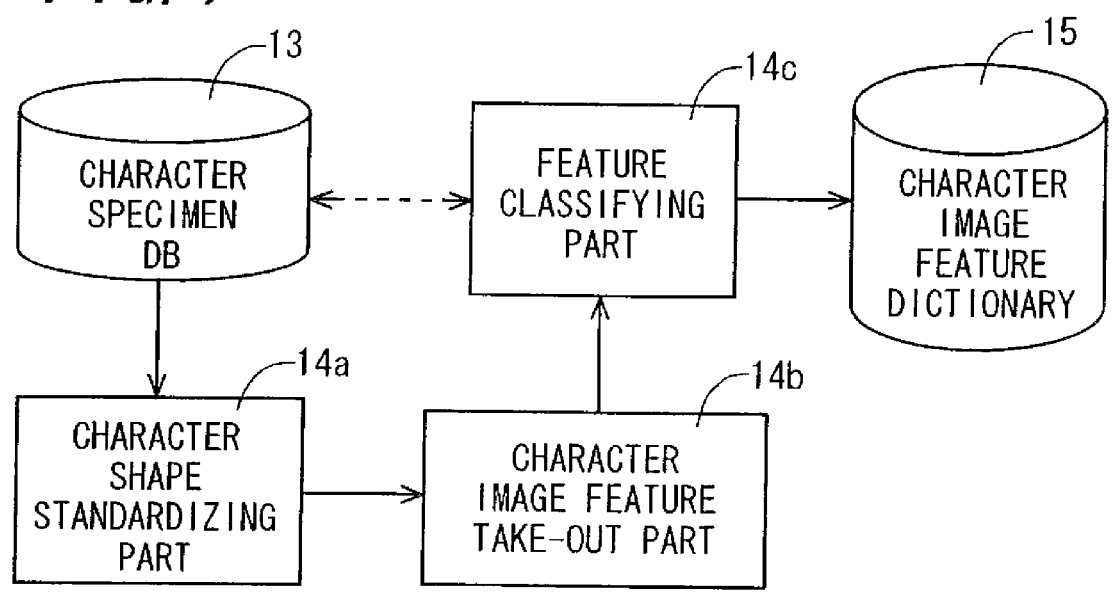
FIG. 7 is a view showing a process on how a character image feature extracting portion prepares a character image feature dictionary.

FIG. 7 shows a process on how the character image feature extracting portion 14 prepares the character image feature dictionary 15. In the character image feature extracting portion 14, a character shape standardizing part 14a takes out a reference character image from the character shape specimen DB 13, and a character image feature take-out part 14b takes out features of the reference character image taken out by the character shape standardizing part 14a. And then, in reference to the character shape specimen DB 13, a feature classifying part 14c classifies the features extracted in units of reference character image, and stores the classified features in the character image feature dictionary 15 where the classified features are then stored.

Figure 8:
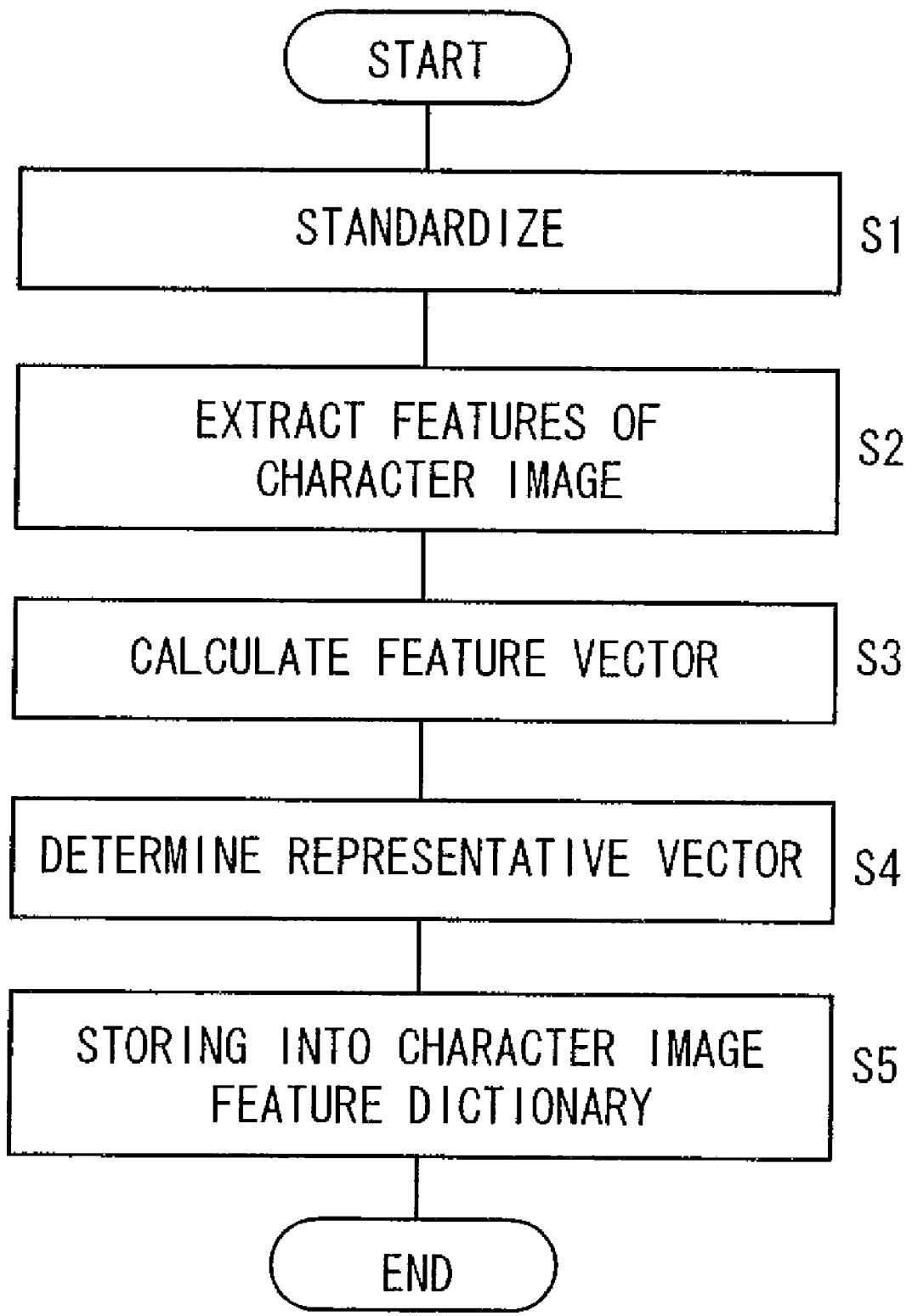
FIG. 8 is a flowchart showing a process on how to prepare the character image feature dictionary.

FIG. 8 is a flowchart showing a process on how to prepare the character image feature dictionary 15.

Figure 9:
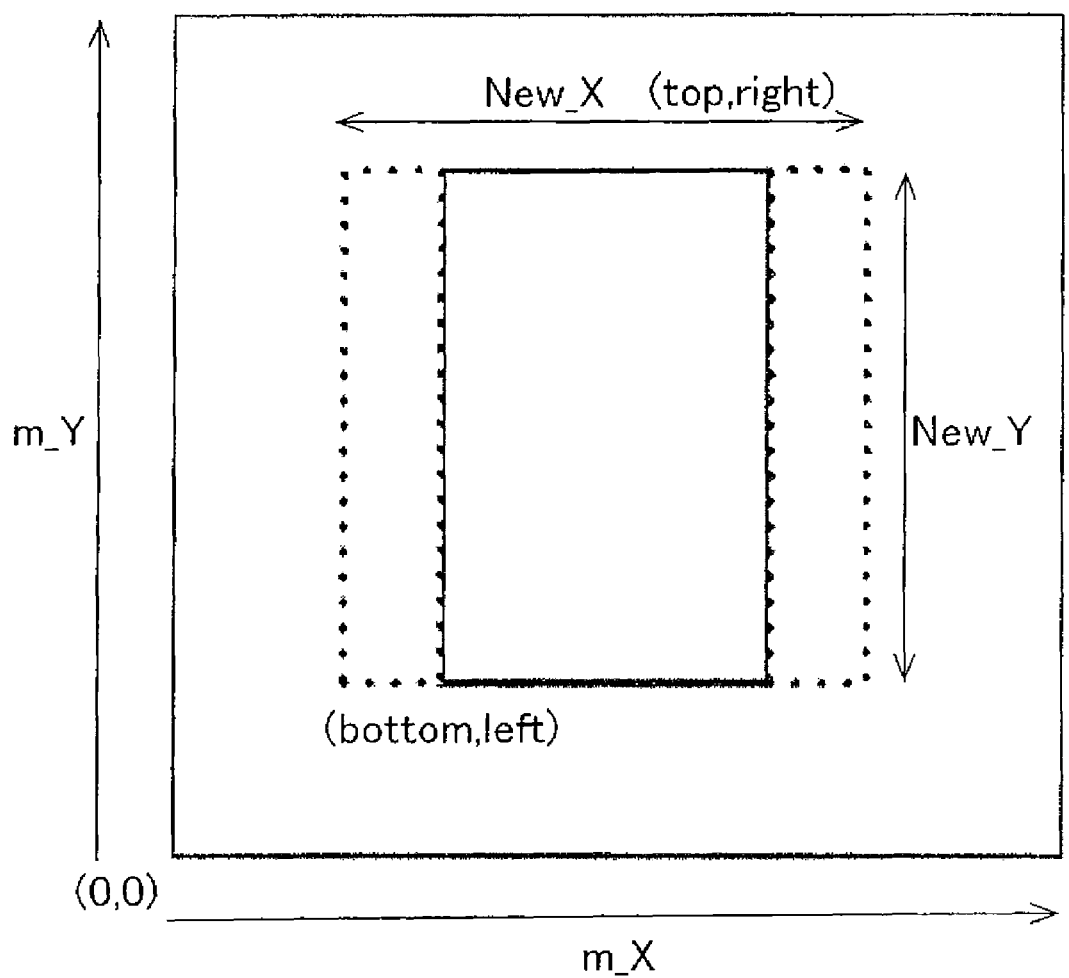
FIG. 9 is a view showing one example of standardizing the character image.

In Step S1, the character shape standardizing portion 14a standardizes each of character images stored in the character shape specimen DB 13 into image data of fixed size. FIG. 9 is a view showing one example of standardizing the character image. A part enclosed by a solid line indicates a size before the standardization while a part enclosed by a dashed line indicates a size after the standardization. A blank space of character region generated upon expansion of the character image in the standardization will be filled with background pixels.

Since the size after the standardization is set at a fixed value, all the character images can be formed into the images of the same size.

It is preferred that all the character images be standardized because, for example, in the case of the character image peripheral feature, different features may be extracted from the same character which has different sizes.

In Step S2, the character image feature take-out portion 14b extracts features of every single character in accordance with the three feature-extracting methods as described above.

The character image peripheral feature is indicated by f1, the distribution-direction-wise feature by f2, and the grid-direction-wise feature by f3. Further, for these features, the weights are set which correspond to the font types such as Chinese, alphabet, and numeral. A weight for the character image peripheral feature is indicated by w1, a weight for the distribution-direction-wise feature by w2, and a weight for the grid direction feature by w3.

In this case, vectors indicating respective features in the three feature-extracting methods are defined by f1×w1, f1×w2, and f3×w3, of which magnitudes are respectively indicated by D1, D2, and D3.

When F represents the feature of the character image, F is indicated by the resultant vector of three feature vectors of f1×w1, f1×w2, and f3×w3. The magnitude of the resultant vector is obtained by D1+D2+D3.

In Step S3, the resultant vector F thus obtained is calculated as the feature vector which represents the character, and in Step S5, the resultant vector F is brought to the character image feature dictionary 15 where the resultant vector F is then stored.

Furthermore, it is preferred that the weights for the respective features be set according to the font types. By changing the setting of the weights depending on the font types, feature vectors F will be determined for respective font types of a single character. A plurality of the feature vectors for the respective font types of the single character may be stored in the character image feature dictionary 15, but it is preferred that, in order to avoid an excessive increase in a storage capacity of the character image feature dictionary 15, one representative feature vector be determined among the plurality of the obtained feature vectors in Step S4, and then stored in the character image feature dictionary 15 in Step S5.

As a way to determine the representative feature vector, the learning vector quantization (LVQ) method is applicable. In the application of the LVQ method, a vector which has the shortest distance from all the other vectors is selected from a plurality of the feature vectors, and determined as the representative vector.

Note that the calculation of one feature vector with use of the three feature-extracting methods as described above may not have to be applied and alternatively, features of each of characters extracted in the three feature-extracting methods may be stored in the character image feature dictionary 15. That is to say, in the flowchart shown in FIG. 8, Step S3 and Step S4 may not be carried out, but features extracted in Step S2 by the respective feature-extracting methods may be stored in the character image feature dictionary 15.

Next, descriptions will be given to the document image DB 19, the document image feature DB 20, the heading region initial processing portion 18, and the character image feature extracting portion 14, which constitute a document image feature extracting section 31 for performing the document image feature extracting process.

The document image DB 19 is used to assign a document ID for identification to a document image inputted by the document image inputting portion 21 and store the document image with the document ID.

After a new document image is stored in the document image DB 19, the heading region initial processing portion 18 is used to locate a heading region of the document image according to the image data thereof, clip the heading region, and send character images thereof to the aforementioned character image feature extracting portion 14.

Figure 10:
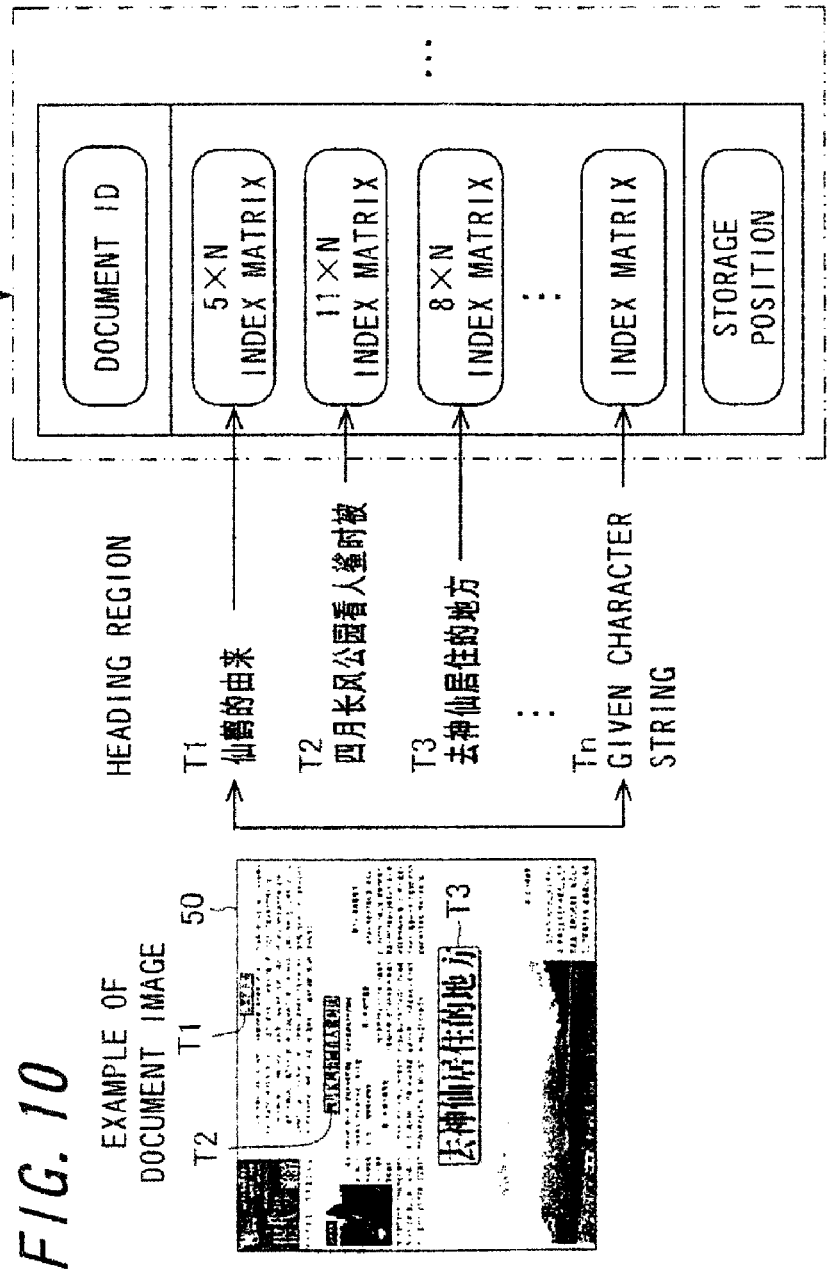
FIG. 10 is a view showing a view showing a state where three heading regions T1, T2, and T3 have been located in a document image.

FIG. 10 shows a state where three heading regions T1, T2, and T3 have been located in a document image 50. As will be appreciated from FIG. 7, title parts of the document image 50 are clipped as heading regions T.

The character images which are clipped by the heading region initial processing portion 18 and thereafter sent to the character image feature extracting portion 14, are generally images of character string including a plurality of characters. Accordingly, the following descriptions will be based on that the character images sent by the heading region initial processing portion 18 are the images of character string.

In the present embodiment, the heading region initial processing portion 18 locates the heading regions and clips the heading regions by means of a projection method and a statistical analysis of communicating area. Note that the heading regions T as mentioned above often correspond to tile parts. Various existing methods can be applied to locate and clip the heading regions, for example, the methods described in the Japanese Unexamined Patent Publications JP-A 9-319747 (1997) and JP-A 8-153110 (1996).

As has been described above, only the heading regions T are located and clipped, without covering the whole character region (text region) of a document image. This enables a reduction in an amount of information to be searched, thereby shortening searching time.

Locating only the heading regions T, not the whole text region, is however not an essential constituent factor from the aspect of searching, and the whole text region may be located and clipped. Locating only the heading regions T is, on the other hand, an essential constituent factor from the aspect of preparing meaningful document names which will be described later on.

The character image feature extracting portion 14 divides the images of character string inputted from the heading region initial processing portion 18 into respective character images of single character. After that, the character image feature extracting portion 14 extracts features of each character image. Subsequently, the extracted features are stored, for every document image, in the document image feature DB 20.

The extraction of features of respective character images is carried out in the same extracting procedure as that in preparing the character image feature dictionary 15. That is to say, the feature vector is calculated in the same procedure as those Steps S1 to S3 shown in FIG. 8.

The document image feature DB 20 stores image feature information of character string included in the heading regions T which have been clipped by the heading region initial processing portion 18, as a feature (feature vector) of each of characters constituting the character string.

As shown in FIG. 10, with respect to one document image 50, the document image feature DB 20 stores, together with the document ID of the document image 50, the character image features of character strings included in all the clipped heading regions T1, T2, T3 . . . , or the character image features of the respective characters constituting the character strings.

Next, descriptions will be given to the character image feature extracting portion 14, the character image feature dictionary 15, the feature similarity measurement portion 16, the index information DB 17, and the document image feature DB 20 which constitute an index information producing section 32 for performing an index information preparing process.

The functions of the character image feature extracting portion 14, character image feature dictionary 15, and document image feature DB 20 are as already described above.

The feature similarity measurement portion 16 reads out features, from the document image feature DB 20, of the character images included in the heading regions T of document image. On the basis of the read-out features, the feature similarity measurement portion 16 prepares, in reference to the character image feature dictionary 15, an index matrix as mentioned later, thereby producing index information of document image.

In this case, the index information is produced for each of document images, and the index matrix included in the index information is prepared for each of heading regions T.

Accordingly, when one document image includes a plurality of heading regions T, a plurality of index matrices will be included in the index information of the document image.

Figure 11:
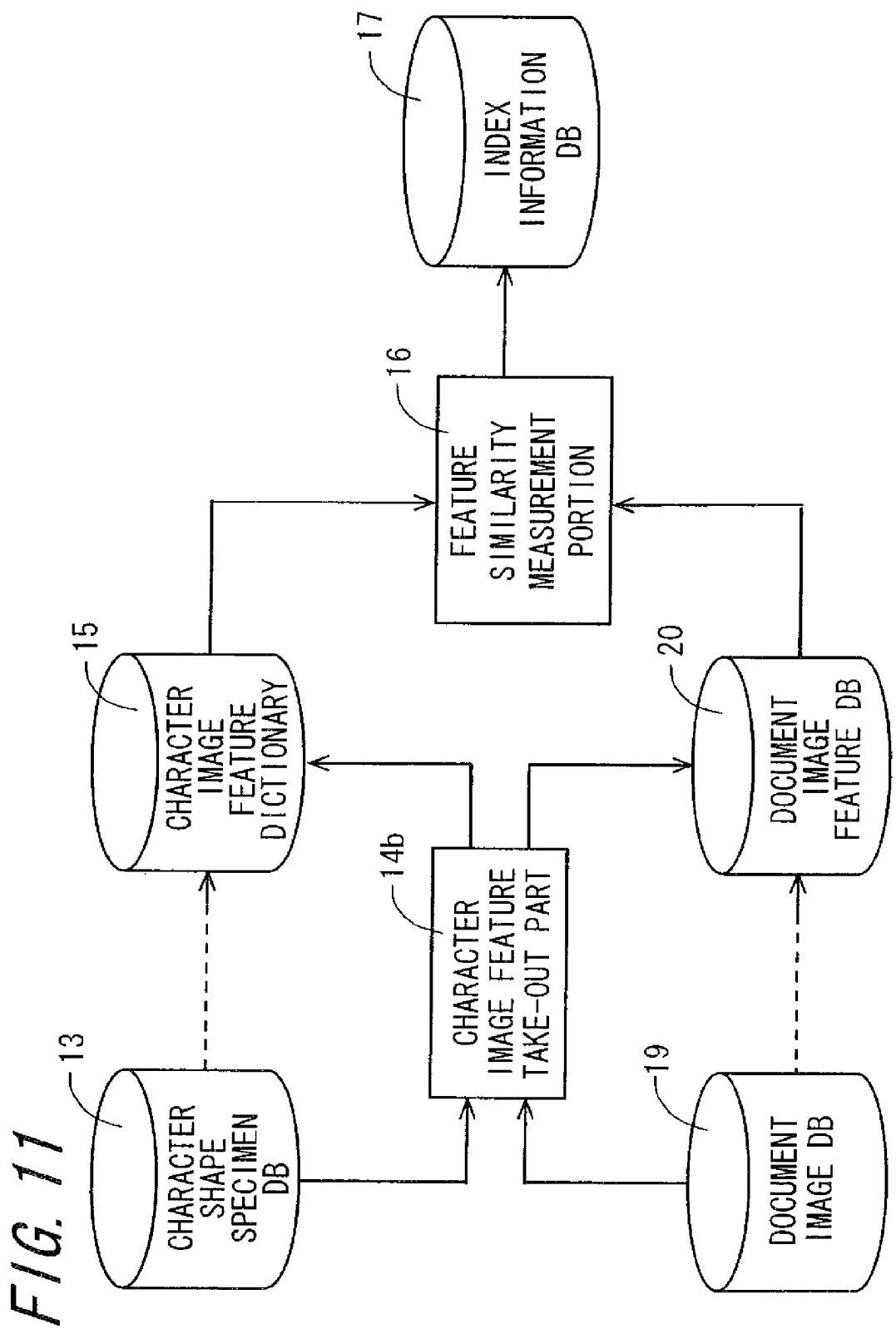
FIG. 11 is a view showing a process on how to prepare an index information DB.

FIG. 11 shows a process on how to prepare the index information DB 17. As mentioned above, after a certain document image is inputted and stored in the document image DB 19, the character image feature extracting part 14b extracts character image features of a character string included in each of heading regions T and stores the extracted features in the document image feature DB 20 where the extracted feature is then stored.

The feature similarity measurement portion 16 reads out from the document image feature DB 20 the image features of the character string included in each of reading regions T. And then, the feature similarity measurement portion 16 carries out measuring similarity of the image of every single character with the reference character image included in the character image feature dictionary 15, thereby preparing an index matrix for each of heading regions T.

And then, the feature similarity measurement portion 16 forms index information by combining these index matrices with the other information of the document image, i.e., information such as the document ID and storage position of the document image in the document image DB 19. The feature similarity measurement portion 16 stores the index information in the index information DB 17 where the index information is then stored.

Figure 12:
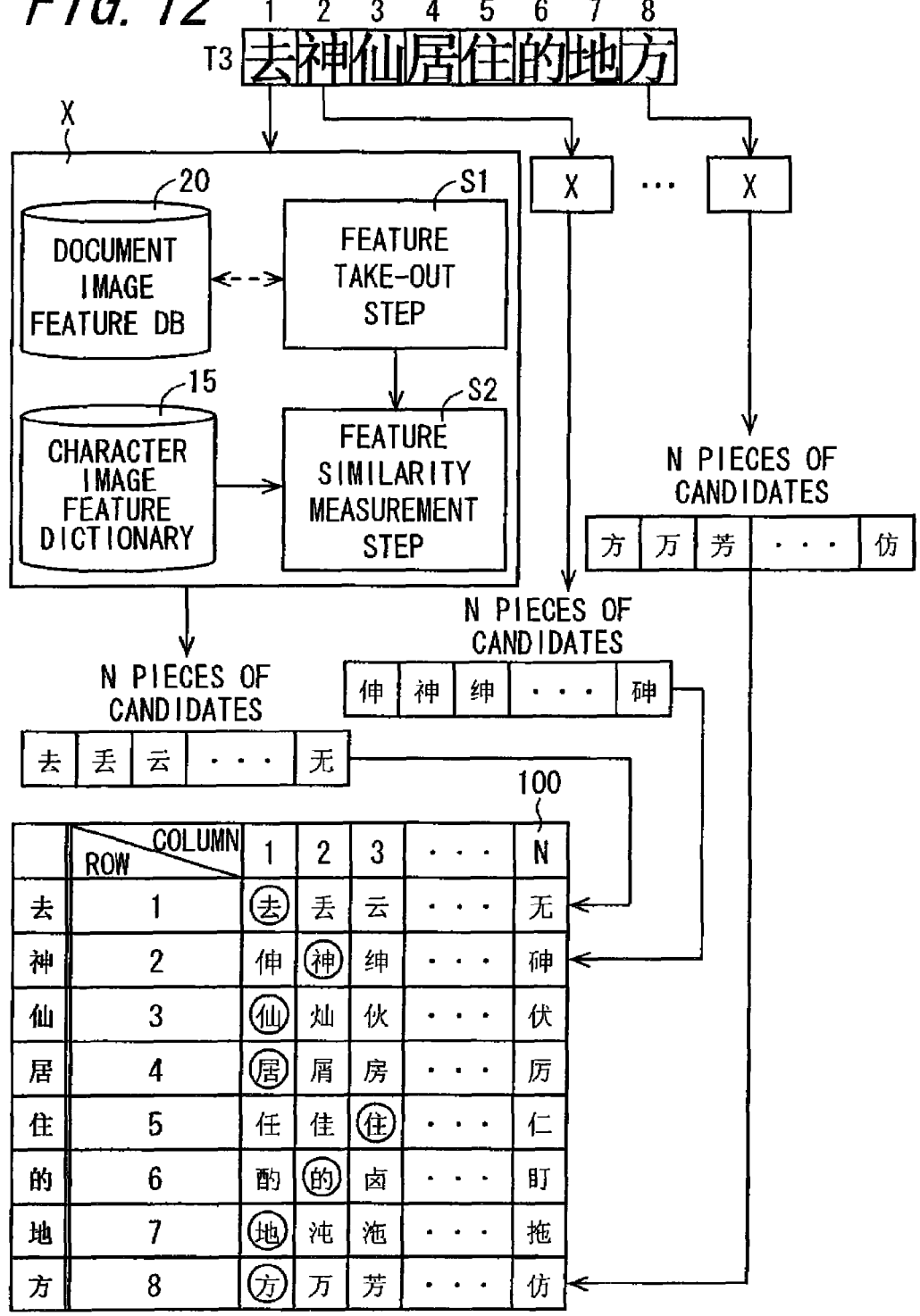
FIG. 12 is a view showing one example of a process on how a feature similarity measurement portion prepares an index matrix.

FIG. 12 shows one example of a process on how the feature similarity measurement portion 16 prepares the index matrix. FIG. 12 is an illustration on how to prepare an index matrix corresponding to eight character images of a character string "去神仙居住的地方" included in the heading region T3 of FIG. 10.

The character string "去神仙居住的地方" is divided into images of separate characters of "去", "神", "仙", "居", "住", "的", "地", and "方". For such a process of dividing the image of character string into the images of separate characters, an existing dividing method can be used.

Eight numbers from 1 to 8 are assigned to the eight characters of "去", ..., "方" according to an alignment order thereof, in such a manner that a number 1 is assigned to "去", ..., and a number 8 is assigned to "方". The numbers here correspond to row numbers of the index matrix.

All of the above eight character images are subjected to a process comprising the following two steps as indicated by a referential symbol X in FIG. 12. One step is designed for taking out features of the character image "去" stored in the document image feature DB 20. The other step is designed for selecting N pieces of candidate characters in descending order of feature similarity (or in the descending order of degree of similarity) in reference to the character image feature dictionary 15. For example, Euclidean distance is calculated between the feature vector of the character image "去" and a feature vector of each character stored in the character image feature dictionary 15. And then, a character which leads to a short Euclidean distance may be recognized as having a high degree of similarity, thus being selected as the candidate character.

Numbers corresponding to the extracting order are assigned to the N pieces of candidate characters extracted in descending order of degree of similarity. The numbers correspond to column numbers of the index matrix. A character correlation value (a correlation value) represents a degree of similarity between each of search characters included in a search keyword and candidate characters thereof. The correlation value is set according to the column numbers.

Now, in the case where the features stored in the character image feature dictionary 15 are features intact after obtained by the respective feature-extracting methods for the character image peripheral feature, the grid-direction-wise feature, and the distribution-direction-wise feature, the candidate character cannot be selected based on the distance between the feature vectors, with the result that the candidate character is selected in the following manner.

In the document image feature DB 20, the features obtained in the three feature-extracting methods have been stored in advance as the features of the character images.

For each of the feature-extracting methods for the character image peripheral feature, grid-direction-wise feature, and distribution-direction-wise feature, N pieces of the candidate characters are independently selected from the character images stored in the document image feature DB 20.

The candidate characters selected based on the character image peripheral feature are indicated by (PC1, PC2, ..., PCN), the candidate characters selected based on the grid-direction-wise feature are indicated by (GC1, GC2, ..., GCN), and the candidate characters selected based on the distribution-direction-wise feature are indicated by (DC1, DC2, ..., DCN). The weights for these candidate characters are indicated by (w1, w2, ..., wN). The weight for the character image peripheral feature is indicated by WP. The weight for the grid-direction-wise feature is indicated by WG. The weight for the distribution-direction-wise feature is indicated by WD.

A possibility of selecting identical characters is high even based on different features in each of the candidate characters. In the case where the identical characters are selected, these identical characters are pulled together into one character, thereby allowing for the calculation of matching level with the other candidate characters.

The candidate character string of reference is now represented by (PC1, PC2, ..., PCN), a character identical to the character selected for PC1 is picked up from the remaining two candidate character strings, and the weight mentioned above is used to calculate the matching level L_PC1 for the character selected for PC1. Note that when the characters identical to the character selected for PC1 are DC3 and GC2, the matching level is calculated by L_PC1=WP×w1+WD×w3+WG×w2.

Next, a character identical to the character selected for PC2 is picked up from the remaining two candidate character strings to calculate the matching level L_PC2. Repeating the above operation will achieve the calculations of the matching levels for respective characters, from which the characters are selected in descending order of matching level. To the selected candidate characters, numerals corresponding to the matching order are appended, which numerals will correspond to column numbers of the index matrix.

Note that the candidate character string of reference is not limited to the candidate character string (PC1, PC2, ..., PCN) selected based on the character image peripheral feature and may be the candidate character string selected based on the other features as long as desired candidate characters which are different from each other, can be selected from K pieces of characters (wherein K represents an integer that satisfies N≦K≦3N) selected based on the character image peripheral feature, the grid-direction-wise feature, and the distribution-direction-wise feature.

A table indicated by a reference numeral 100 in FIG. 12 shows the content of index matrix of the character string "去神仙居住的地方". For example, for the character image of the fifth character "住", candidate characters of "任", "任", "住", ..., "仁" are extracted and positioned in Row 5 in descending order of degree of similarity. The character having the highest degree of similarity is positioned in the first column. In Table 100, the position of the candidate character "去" is represented as [1, 1], the position of the candidate character "屑" is represented as [4, 2], and the position of the candidate character "仁" is represented as [5, N].

Note that the candidate characters corresponding to the respective characters in the character string are circled in Table 100 of FIG. 12, to facilitate the understanding.

The row number M of the index matrix as has been described heretofore, is determined in accordance with the number of image character in the character string that is clipped as the heading region T by the heading region initial processing portion 18. In addition, the column number N is determined in accordance with the number of candidate characters selected in units of character. Consequently, according to the present invention, by changing the number of dimensions (the number of columns) of index matrix, it is possible to flexibly set the number of elements inside the index matrix or the number of candidate characters. This allows for a precise and substantially complete search in searching the document image.

A way on how the selected candidate character carries information in the index matrix can be appropriately set in accordance with a method of inputting the search keyword. For example, in the constitution that the keyword is inputted from the keyboard 1, the candidate characters are stored in form of information such as character codes, in such a manner that the search keyword inputted from the keyboard 1 can be targeted for searching.

In addition, in the constitution that the keyword is inputted in form of digital data by use of the image scanner 2 and the like, the candidate characters may be stored in form of feature (feature vector) information, in such a manner that the features (feature vectors) of the search keyword can be extracted and the extracted feature vectors can be compared with each other for searching.

FIG. 10 shows an example of data placement of index information in the index information DB 17. In index information of a document image 50 having a plurality of heading regions T1, T2, T3, . . . , Tn, index matrices are linearly-aligned that have been prepared with respect to the plurality of heading regions T1, T2, T3, . . . , Tn. In an example of FIG. 10, a document ID is placed on the top, followed by a plurality of the index matrices, and information of a storage position is placed on the bottom. Here, 5×N represents a size of the index matrix, which has five rows and N columns.

By placing the index information in the way as has been mentioned heretofore, it is possible to swiftly identify storage positions of document image and positions of heading region T of document image in the document image DB 19. The aforementioned identified position information can be used for displaying a search result.

Moreover, in response to a demand in practice, other attributes of the document image may be added to the index information.

Further, in the invention, the lexical analysis method using a language model is applied to the index matrix 100, so as to adjust the respective candidate characters constituting the candidate character string into a candidate character string which makes sense.

To be more specific, on the basis of the prepared index matrix 100, the feature similarity measurement portion 16 prepares a candidate character string by sequentially arranging the first-column candidate characters of the respective rows of the prepared index matrix. And then, the semantic analysis is performed on the word composed of the candidate characters in the respective successive rows constituting the candidate string. And the first-column candidate characters in the respective rows are adjusted in such a manner as that the candidate character string has a meaning.

Figure 13:
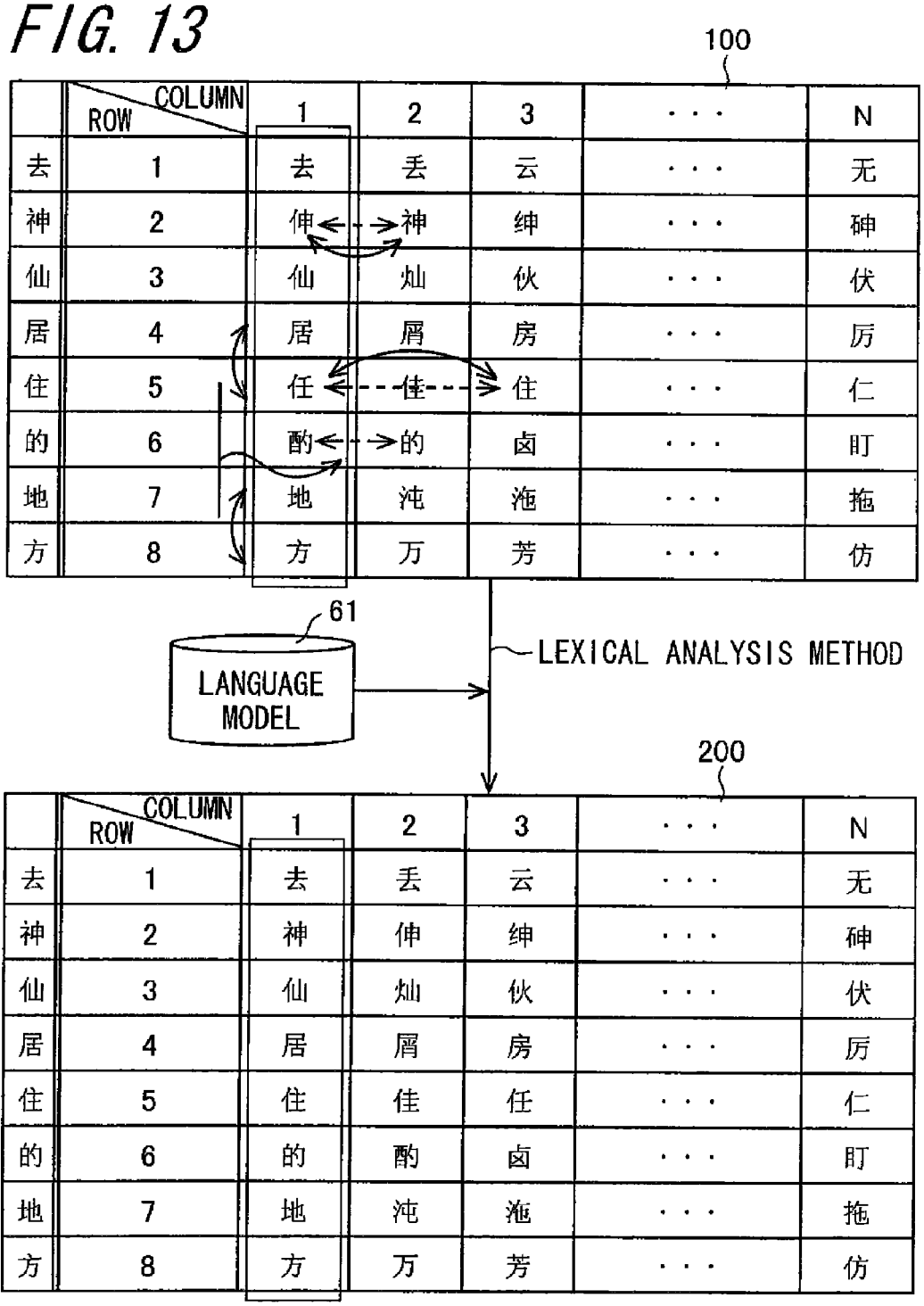
FIG. 13 is an illustration showing a specific example of index matrices before and after such an adjustment using the lexical analysis method that a character string of the first column in the prepared index matrix is adjusted into a character string which makes sense.

FIG. 13 is an illustration showing a specific example of index matrices before and after such an adjustment using the lexical analysis method that the character string of the first column in the prepared index matrix is adjusted into a character string which makes sense.

The upper part of the FIG. 13 shows an index matrix 100 before adjustment. A candidate character string formed according to the index matrix 100 is "去神仙居住酌地方" which has no meaning.

With respect to a candidate character string that can be used as the meaningful document name, the conjunction relationship between a subject, a predicate, and an object must be correct semantically. Consequently, by means of the lexical analysis, the aforementioned character string is converted into a candidate character string which makes sense. Specifically, by use of a conceptual dictionary, semantic information is analyzed between the plurality of error candidate characters and the other words in the candidate text, so that the candidate character string is revised to be a candidate character string which makes sense.

A language model 61 used in the lexical analysis as has been mentioned heretofore, may be one that provides statistical data of all prints starting from the Chinese character. That is, according to main concepts of this language model 61, an automatic index system can be established technically. It is possible to obtain the statistical data on the script of news (e.g., "People's Daily") written in Chinese.

In the present embodiment, a bi-gram model is adopted as the language model.

The bi-gram model is a bisyllabic, biliteral, or bilexical group. The bi-gram is generally used to a remarkable degree as the basis of simple statistical analysis of text.

FIG. 14 is a view showing a constitution example of dictionary data 300 used in the bi-gram model.

The first column 301 of the dictionary data shows the first character forming a two-character combination. The second column 302 shows the number of the characters forming the combination with the first character. The third column 303 shows the characters forming the combination with the first character. The fourth column 304 shows a frequency of forming the combination. Further, the fifth column 305 shows the number of Chinese characters forming the combination. Here, the bi-gram model is used, so the number of the character is all two.

In adjusting the candidate character string, on the basis of the Markov process, a Vitarbi-style search is performed by mainly using contextual information in words, such as the probability of character transition and character mixture.

By use of Help function of the aforementioned Chinese dictionary, the index matrix is adjusted automatically. Moreover, after the adjustment, all optimum candidates are adjusted to be placed at the first column.

On the basis of the index matrix 100 determined only from the degree of similarity of the respective characters, firstly, the character string of the first column is adjusted according to the bi-gram model using a context search. Consequently, this enables enhancements in the accuracy and efficiency of candidates with respect to similarity.

For the sake of enhancing the accuracy, the character string is partially adjusted according to a word-based bi-gram model. This causes a decrease in the processing speed, but enables a high accuracy.

Here, an adjusting method will be described in detail by taking the index matrix 100 as an example.

By using a character-based big-gram model, in consideration of the relationship between the characters in the second row and the third row, the first candidate "神" is replaced by the second candidate "神" in the second row so that the character "神" is located in the first column as a first candidate. In addition, in the fifth row, the first candidate "任" is replaced by the third candidate "住" so that the character "住" is located in the first column as a first candidate, in consideration of the relationship between the characters in the fourth row and the fifth row.

Further, an adjustment is performed according to a word-based bi-gram model. According to the word attributes of "神仙" and "居住" as well as a relativity thereof, the first character "酌" is replaced by the second candidate "的" so that the character "的" is located in the first column as a first candidate.

In this way, the index matrix 100 is adjusted into the index matrix 200 whose first column has a candidate character string "去神仙居住的地方" that makes sense. Note that the feature similarity measurement portion 16 may store the index matrix 200 which is obtained through the above adjustment, in the index information DB 17 where the index matrix 200 is then stored.

Figure 15A:
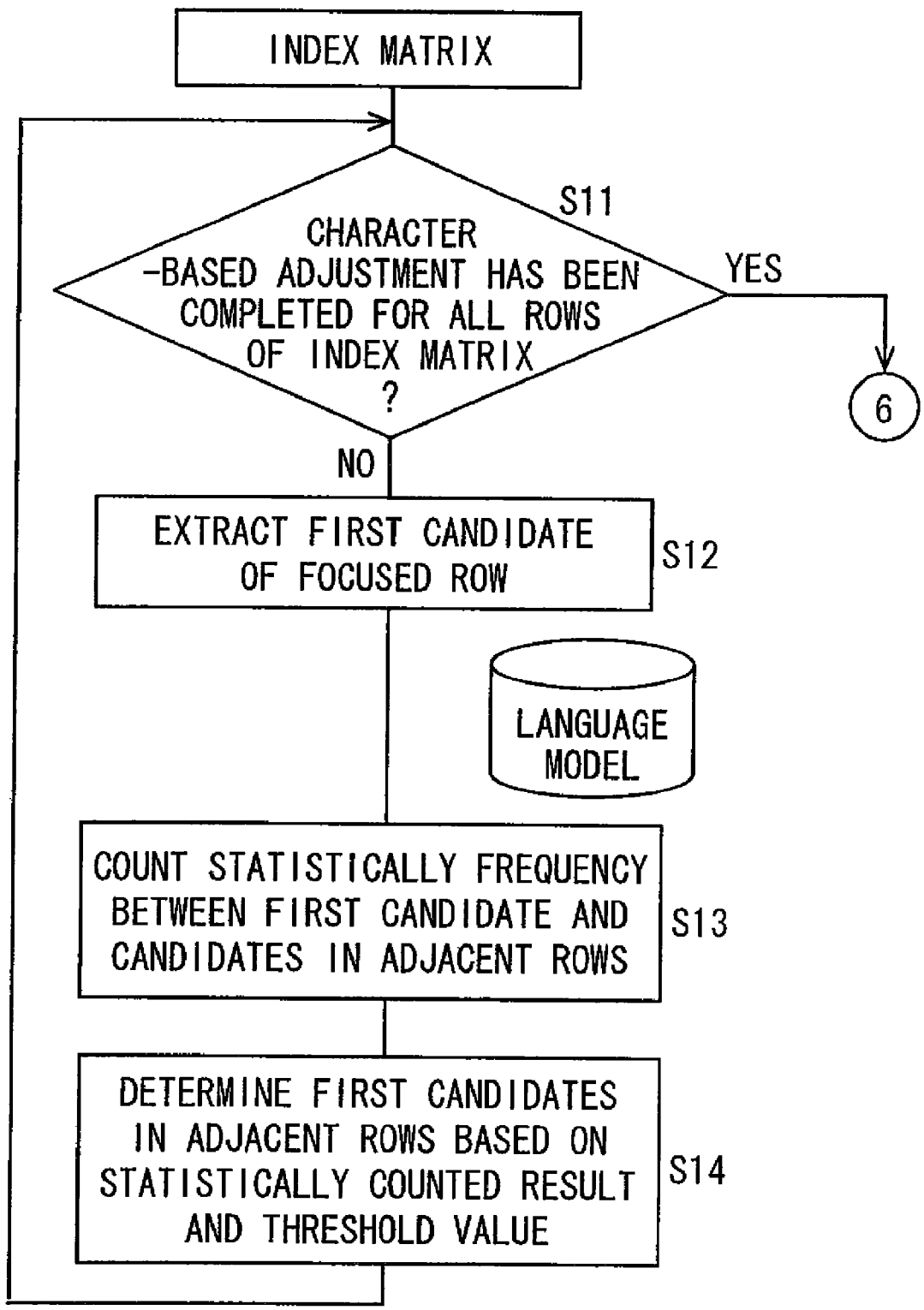
FIGS. 15A and 15B are flowcharts showing a method of adjusting an index matrix using the bi-gram model.
Figure 15B:
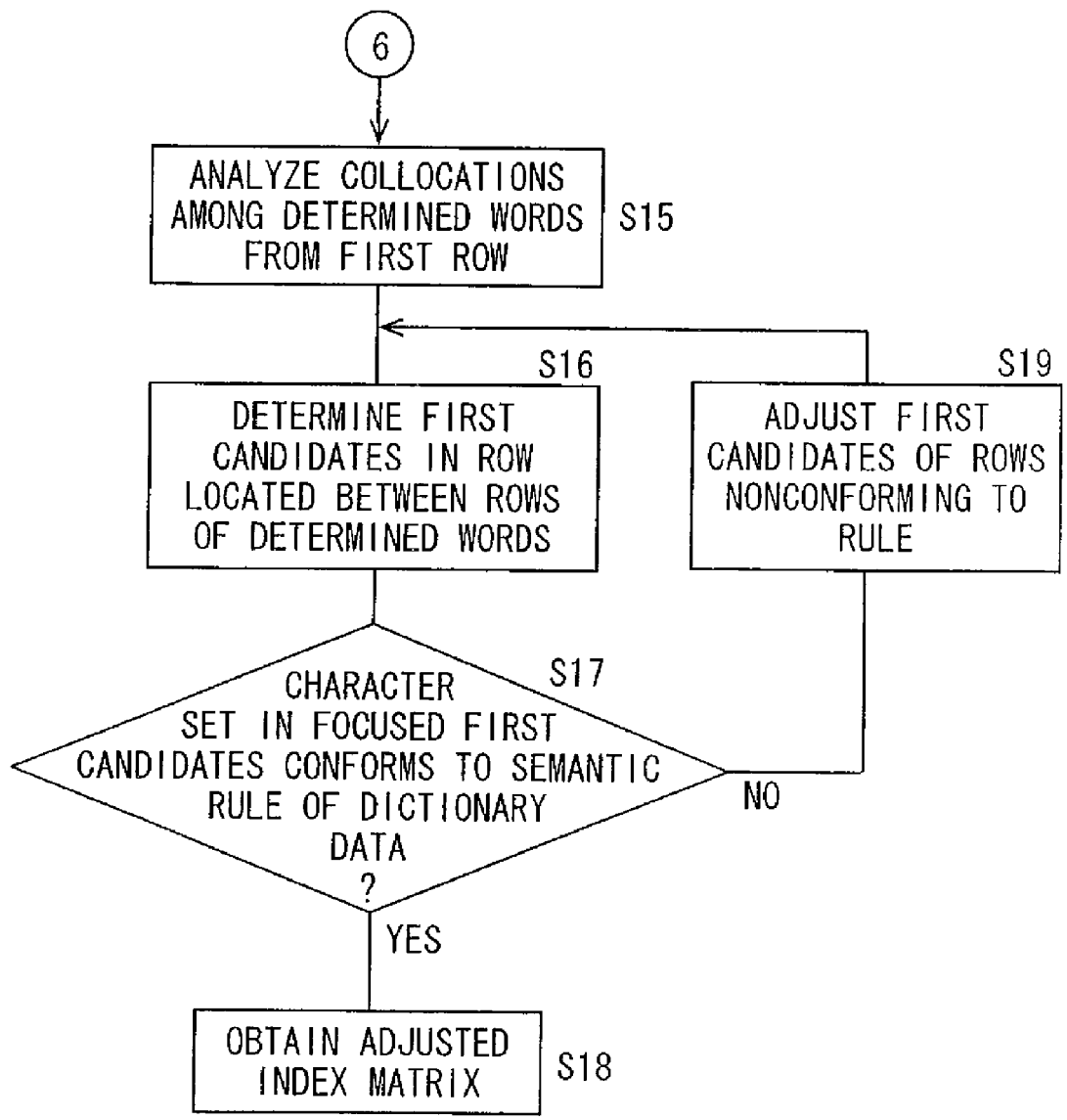

FIGS. 15A and 15B are flowcharts showing a method of adjusting the index matrix using the bi-gram model. The adjusting process consists of nine steps.

In Step S11, it is determined whether or not the character-based adjustment has been completed for all the rows of the index matrix. When the adjustment has not been completed, the adjusting process goes to Step S12. Contrarily, when the adjustment has been completed, the adjusting process goes to Step S15.

In Step S12, the first candidate is extracted of the focused row, that is, the first row in the case of the first processing. In Step S13, by applying the bi-gram model, occurrence frequencies in the dictionary are counted statistically for respective combinations of the first candidate in the focused row and the respective candidates in the adjacent rows.

In Step S14, a comparison is made between the counted value and a predetermined threshold value. When the counted value is greater than the predetermined threshold value, the candidate is adopted as the first candidate.

In Step S15, the collocations among the determined first candidates are analyzed from the first row so as to determine a word. In Step S16, a first candidate is determined in a row between the rows of determined words.

In Step S17, it is determined whether or not the character set in the focused first candidate character string conforms to the semantic rule of the dictionary data. When the character set conforms to the semantic rule, the adjusting process goes to Step S18 and an adjusted index matrix is obtained. In this case, the adjusting process is completed. Contrarily, when the character set fails to conform to the semantic rule, the adjusting process goes to Step S9. In Step S19, the first candidates of the nonconforming rows are adjusted, and the adjusting process goes back to Step S16.

Figure 16:
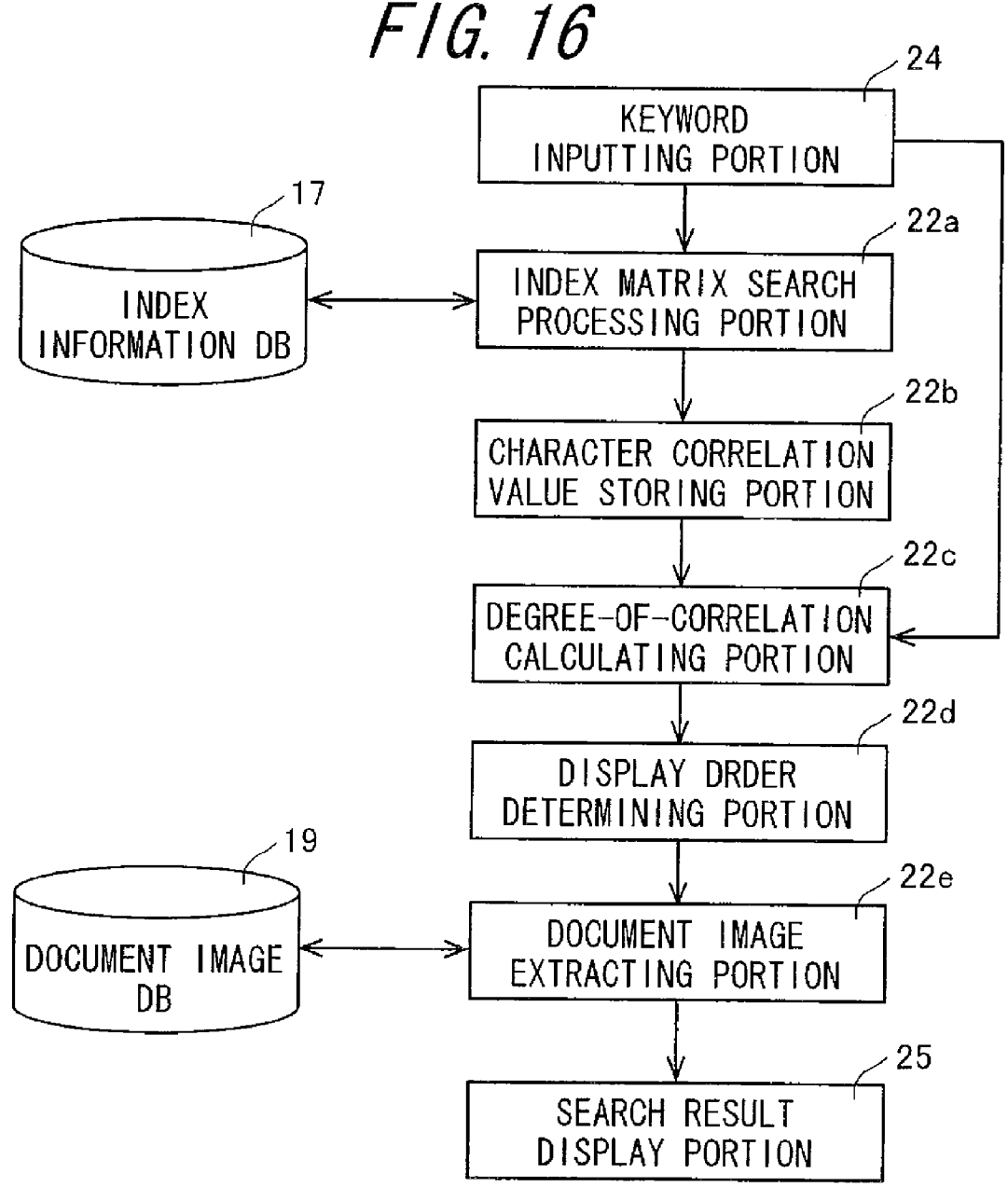
FIG. 16 is an illustration showing functions and a searching process of a searching section.

Next, descriptions will be given to a searching section 22, which performs a search process by use of the index information. FIG. 16 is an illustration showing functions and a search process of the searching section 22. The searching section 22 includes an index matrix search processing portion 22a, a character correlation value storing portion (storing portion) 22b, a degree-of-correlation calculating portion 22c, a display order determining portion (order determining portion) 22d, and a document image extracting portion 22e.

A search keyword is inputted from the keyword inputting portion 24 to the index matrix search processing portion 22a. An example of the keyword inputting portion 24 is the aforementioned keyboard 1 or the aforementioned image scanner 2, etc.

The index matrix search processing portion 22a searches the index information DB 17 so as to detect index matrices including the inputted search keyword. The index matrix search processing portion 22a divides the search keyword into separate search characters and searches for the index matrices including the respective search characters. In this way, when the search characters are included, the index matrix search processing portion 22a acquires matching position information in the index matrices of the search characters. Note that an example of procedure for extracting the index matrix will be described in reference to a flowchart in FIG. 17.

The character correlation value storing portion 22b stores the matching position information acquired by the index matrix search processing portion 22a, and also stores a character correlation value corresponding to the column number of matching position.

After the index matrix search processing portion 22a completes the detection of all the index matrices, the degree-of-correlation calculating portion 22c calculates a degree of correlation between the detected index matrix and the search keyword.

By means of a predetermined method for calculating the degree of correlation, the degree of correlation is calculated using the information of matching position and the information character correlation value stored in the character correlation value storing portion 22b. The calculation of the degree of correlation will be described in reference to FIGS. 18 and 19 later on.

Note that although the constitution employed herein has the character correlation value storing portion 22b which stores the matching position information and the character correlation value corresponding to the column number of the matching position, another constitution may be adopted such that the character correlation value storing portion 22b stores only the matching position information while the degree-of-correlation calculating portion 22c acquires the character correlation value corresponding to the matching position information.

The display order determining portion 22d determines a display order on the basis of the information of degree of correlation calculated by the degree-of-correlation calculating portion 22c. According to an order of document images which are arranged in descending order of degree of correlation of the index matrixes included therein, the display order determining portion 22d determines the display order in such a manner as to allow the content of document images to be displayed by the search result displaying portion 25.

The document image extracting portion 22e reads out image data of document image from the document image DB 19 and outputs the image data to the search result displaying portion 25 so that the document image is displayed on the search result displaying portion 25 in the order determined by the display order determining portion 22d.

The search result displaying portion 25 displays document images according to a display order. The document images may be displayed in thumbnailed form or the like. An example of the search result displaying portion 25 is the aforementioned display device 3 or the like device.

Now, the search procedure will be described. FIG. 17 is a flowchart showing the search procedure in the searching section 22. Step S11 is firstly performed when a search keyword composed of R pieces of character string is inputted and a searching instruction is given correspondingly. In Step S21, the index matrix search processing portion 22a extracts the first search character of the search keyword.

Next, the search procedure goes to Step S22. In Step S12, the index matrix search processing portion 22a searches for the first search character in all the index matrices of the index information DB 17.

When all the index matrices have been searched, it is determined in Step S23 whether or not the first search character has been detected. When the first search character has not been detected at all, the search procedure goes to Step S19. Contrarily, when the first search character has been detected, the search procedure goes to Step S24.

In Step S24, the index matrix search processing portion 22a stores matching position information and character correlation values of the index matrices including the first search character, in the character correlation value storing portion 22b where the matching position information and character correlation values are then stored.

Subsequently, the search procedure goes to Step S25. In Step S25, the index matrix search processing portion 22a extracts all index matrices including the first search character. And then, in Step S26, the index matrix search processing portion 22a extracts another character of the search keyword, which serves as the second search character, and searches for the second search character in the index matrices including the first search character.

After all the index matrices extracted in Step S25 have been searched, the search procedure goes to Step S27. In Step S27, it is determined whether or not the second search character has been detected. When the second search character has not been detected at all, the search procedure goes to Step S29 as in the above case. Contrarily, when the second search character has been detected, the search procedure goes to Step S28.

In Step S28, the index matrix search processing portion 22a stores matching position information and character correlation values of the index matrices including the second search character, in the character correlation value storing portion 22b where the matching position information and character correlation values are then stored.

Next, back to Step S26 again, the index matrix search processing portion 22a extracts yet another character of the search keyword, which serves as the third search character. And further, the index matrix search processing portion 22a searches for the third search character in the index matrices including the first search character extracted in Step S21.

And then, similarly, when the aforementioned search has been completed, Step S17 is performed. In Step S27, the index matrix search processing portion 22a determines whether or not the third search character has been detected. When the third search character has not been detected at all, the search procedure goes to Step S29 as in the above case. Contrarily, when the third search character has been detected, the search procedure goes to Step S28. In this way, the aforementioned search process is performed with respect to yet another search character of the search keyword.

The process from Step S26 to Step S28 as has been described heretofore, refers to a search refinement for the second or following search character in the index matrices which include the first search character and thus extracted in Step S25. The index matrix search processing portion 22a performs the above process from Step S26 to Step S28 until such a determination is obtained in Step 27, that the search character has not been detected at all, or until such a determination is obtained that all the search characters in the search keyword have been searched for. The search procedure then goes to Step S29.

In Step 29, the index matrix search processing portion 22a takes out a next character in the search keyword, which serves as the second search character. Subsequently, in Step S30, it is determined whether or not the last search character has been searched for, that is, whether or not all the search characters have been subjected to the process from S26 to S29. When not all the search characters have been subjected to the process from S26 to S29, the search procedure goes back to Step S22.

And then, as have been mentioned heretofore, the index matrix search processing portion 22a searches for the second search character in all the index matrices in the index information DB 17. When the second search character is detected successfully, the matching position and the character correlation values of the index matrices are stored. Next, the procedure goes to Step S25. And the search refinement is performed by repeating Steps S26 to S28, through which next character of the search keyword, that is, the third or following characters coming after the second search character, are searched for in all the index matrices including the second search character.

The index matrix search processing unit 22a also performs the search process as has been described heretofore, sequentially for the third and following search characters. To be specific, in the search process, a next search character is extracted in Step S29, index matrices including the extracted search character are taken out, and the taken-out index matrices are subjected to the search refinement for a search character which follows the search character included in the index matrices.

After all the search characters in the search keyword have been taken out in Step S29, the search procedure goes to Step S30. When it is determined in Step S30 that all the search characters have been subjected to the search process as have described heretofore, the search procedure goes to Step S31.

In Step S31, according to a reference of degree of correlation, the degree-of-correlation calculating portion 22c calculates the correction degree between the search keyword and the respective index matrices in the way as will be described later on.

And then, the search procedure goes to Step S32. In Step S32, the display order determining portion 22d determines a display order. The display order is so determined as to enable the display to begin from the document image including an index matrix of a high degree of correlation. Moreover, in Step S32, the document image extracting portion 22e acquires image data of document image from the document image DB 19 and the search result displaying portion 25 displays the document images in descending order of degrees of correlation thereof.

Subsequently, referring to FIGS. 18 and 19, descriptions will be given to the methods for calculating a degree of correlation between index matrix and the search keyword in the degree-of-correlation calculating portion 22c, according to the reference of degree of correlation.

Search conditions are described in a block indicated by the reference numeral 101 in FIG. 18. For the sake of calculating the degree of correlation, a relative relationship is supposed between a certain search keyword and an index matrix. The relative relationship is described in the block indicated by the reference numeral 102. When the search keyword and the index matrix has the relative relationship as shown in the block 102 under the search conditions shown in a block 101, the degree of correlation between the search keyword and index matrix is calculated correspondingly according to a calculating formula as shown in a block 103.

Firstly, the search conditions in the block 101 are described. The number of characters in the keyword is set at R. The first search character is represented by C1, the second search character is C2, . . . , and the R-th search character is Cr.

An index matrix to be searched is a matrix of M×N cells. That is to say, the number of image characters is M in the character string clipped as the heading region T, and the number of candidate characters is N selected in units of character in the character string.

A character correlation value is defined as a correlation value between a search character and respective candidates thereof. The correlation value is set in accordance with respective positions of the index matrix. Consequently, the character correlation values form a matrix of the same cells as that of the index matrix. That is to say, a matrix Weight of character correlation value is a matrix of M×N cells. For example, Weight[i][j] represents a character correlation value, when a candidate character positioned at [i, j] (also represented by Index[i][j]) in the index matrix is in similarity. In the present embodiment, as long as the column numbers [j] of the index matrix are the same, correlation values of character are the same, independently of row numbers [i].

When a search character is found in two adjacent rows in the index matrix, a degree-of-correlation weighting factor for rows Q is applied to a correlation value of characters in the two rows. When a search character is found in two adjacent rows, it is more likely to include two successively-positioned characters of the search keyword.

When the degree-of-correlation weighting factor for rows Q is set at a high value, a contribution to the degree of correlation calculated by the degree-of-correlation calculation portion 22c is high for the character correlation values of two rows successively in similarity and is low for the correlation values of nonadjacent respective rows becomes small. That is to say, when the degree-of-correlation weighting factor for rows Q is set at a high value, the search result is close correspondingly to the results obtained by searching for the whole vocabulary. Oppositely, when the degree-of-correlation weighting factor for rows Q is set at a low value, the search result is close to the results obtained by searching for the respective characters.

W1 represents the character correlation value corresponding to the search character C1, and W2 represents the character correlation value corresponding to the second search character C2, . . . , and Wr represents the character correlation value corresponding to the search character Cr.

Next, a description will be given to the supposed relative relationship between the search keyword and the index matrix shown in a block 102.

Between the search keyword and the index matrix, there exists a matching relationship between every search character C1, C2, . . . , Cr, and any one of the candidate characters in the index matrix. Matching positions of respective candidate characters matching the respective searching characters C1, C2, . . . , Cr are represented as [C1i, C1j], [C2i, C2j], . . . , [Cri, Crj].

Then, a further relative relationship is expressed by a formula (1) shown in the block 102, that is:

$$C(k+1)i = Cki+1, \ C(m+1)i = Cmi+1 \ (m > k) \quad (1)$$

where k and m represent relative positions of the respective search characters constituting the search keyword; C(k+1)i represents a row number of the index matrix of candidate characters which are in similarity with the (k+1)-th search character of the search keyword; and Cki represents a row number of index matrix of a candidate character matching the k-th search character of the search keyword.

Accordingly, C(k+1)i=Cki+1 represents that the row number in the index matrix of candidate characters which are in similarity with the (k+1)-th search character of the search keyword is identical to a 1-plus row number in the index matrix of candidate characters which are in similarity with the k-th search character of the search keyword. In other words, C(k+1)i=Cki+1 indicates the (k+1)-th search character and the k-th search character are found in two adjacent rows in the index matrix, respectively.

The same goes for C(m+1)i=Cmi+1, which indicates the (m+1)-th search character and the m-th search character in the search keyword are found in two adjacent rows in the index matrix, respectively.

When the search keyword and the index matrix have the relative relationships as have been mentioned heretofore, the degree of correlation between the search keyword and the index matrix is calculated by a formula (2) shown in the block 103. The formula 2 is expressed by:

$$\text{SimDegree} = W1 + W2 + \ldots + W(k-1) + Q^*(Wk + W(k+1)) + \ldots + W(m-1) + Q^*(Wm + W(m+1)) + \ldots + Wr \quad (2)$$

where W1 represents a character correlation value corresponding to the first search character C1, W2 represents a character correlation value corresponding to the second search character C2, and W(k−1) represents a character correlation value corresponding to the (k−1)-th search character C(k−1). Similarly, W(k) represents a character correlation value corresponding to the k-th search character Ck, and W(k+1) represents a character correlation value corresponding to the (k+1)-th search character C(k+1). In addition, W(m−1) represents a character correlation value corresponding to the (m−1)-th search character C(m−1). In the same way, W(m) represents a character correlation value corresponding to the m-th search character Cm, and the W(m+1) represents a character correlation value corresponding to the (m+1)-th search character C(m+1). Then, Wr represents a character correlation value corresponding to the r-th search character Cr.

In this way, the correlation value is calculated by accumulating the correlation values of all the search characters constituting the search keyword.

The k-th search character Ck and the (k+1)-th search character C(k+1) are found in two adjacent rows in the index matrix, respectively. Then, Q*(Wk+W(k+1)) in the formula (2) represents that the sum of the character correlation value Wk and the character correlation value W(k+1) is multiplied by the degree-of-correlation weighting factor for rows Q. It is the same in the case of Q*(Wm+W(m+1)).

Note that the (k−1)-th search character and the k-th search character are not found in two adjacent rows, and therefore both W(k−1) and Wk are not multiplied by the degree-of-correlation weighting factor for rows Q. It is the same in the case of W(m−1) and Wm.

In FIG. 18, however, the character correlation values of all the search characters from W1 to Wr are accumulated in the formula (2) because the search keyword and the index matrix shown in the block 102 are supposed to have such a relative relationship that every search characters C1, C2, . . . , Cr is in similarity with any one of candidate characters in the index matrix.

This is only one example and therefore, in the case where, for example, the search character C1 and the search character Cr have the relative relationship of formula (1) but are not in similarity with any candidate in the index matrix, the degree of correlation is calculated by the following formula:

$$SimDegree = W2 + \ldots + W(k-1) + Q^*(Wk + W(k+1)) + \ldots + W(m-1) + Q^*(Wm + W(m+1)) + \ldots + W(r-1)$$

which formula has less cumulative terms, naturally resulting in a decreased degree of correlation.

Further, in the case where every character C1, C2, ..., Cr is in similarity with any one of candidate characters in index matrix, and the (k+1)-th search character and the k-th search character of the search keyword, as well as the (k+2)-th search character and the (k+1)-th search character, are found in the two adjacent rows, respectively, the degree of correlation is calculated by the following formula:

$$SimDegree = W1 + W2 + \ldots + W(k-1) + Q^*(Wk + W(k+1) + W(k+2)) \ldots + WR$$

In this case, the (k−1)-th search character and the k-th search character of the search keyword are not found in two adjacent rows. Therefore, both W(k−1) and Wk are not multiplied by the degree-of-correlation weighting factor for rows Q.

Next, a specific example is described on how to calculate the degree of correlation in reference to FIG. 19. Here, a degree of correlation is determined between the search keyword "神仙" and the index matrix (refer to Table 200) of the character string "去神仙居住的地方" shown in FIG. 13.

Search conditions are shown in a block 104 of FIG. 19. Correlation value matrix Weight has M×N cells. The character correlation value is represented by Weight[i]=[1, 1-1/N, 1-2/N, ..., 1/N] (i=0, 1, ..., M-1). A degree-of-correlation weighting factor is represented by a symbol Q.

The search keyword "神仙" is divided into the first search character "神" and the second search character "仙". For each of the search characters, an index matrix is searched for a corresponding candidate character.

As will be known in reference to Table 200 in FIG. 13, the search character of "神" corresponds to [2, 2] and the search character of "仙" corresponds to [3, 1] in positions [i, j] of the index matrix.

Accordingly, as shown in a block 105, the character correlation value of the search character "神" is 1, and the character correlation value of the search character "仙" is 1.

The row number of the search character "神" is "2", and the row number of the search character "仙" is "3". As shown in Table 200 of FIG. 13, the two search characters are found in two adjacent rows in the index matrix, respectively.

Accordingly, as shown in a block 106, the character correlation value 1 of the search character "神" and the character correlation value 1 of the search character "仙" are multiplied by the degree-of-correlation weighting factor for rows Q. The degree of correlation between the search keyword "神仙" and the index matrix of the character string "去神仙居住的地方" is thus determined by SimDegree=Q*(1+1)= 2 Q.

In the formula for determining the degree of correlation between search keyword and index matrix, parameters such as the weight (character correlation value) of the correlation value matrix and the degree-of-correlation weighting factor for rows Q can be adjusted in accordance with the user's requirements. Consequently, this enables a more ideal search result to be obtained.

By use of the keyboard 1 and the like, the user can, according to his requirements, set appropriately the parameters such as the weight (character correlation value) of the correlation value index and the degree-of-correlation weighting factor for rows Q.

In the index and the similarity measurement method according to image features as have been mentioned heretofore, index and search of multilingual document images can be satisfied and no character recognition is performed with reduced computational effort. The present invention can be applied to document images of not only Chinese but also various other languages.

Figure 20:
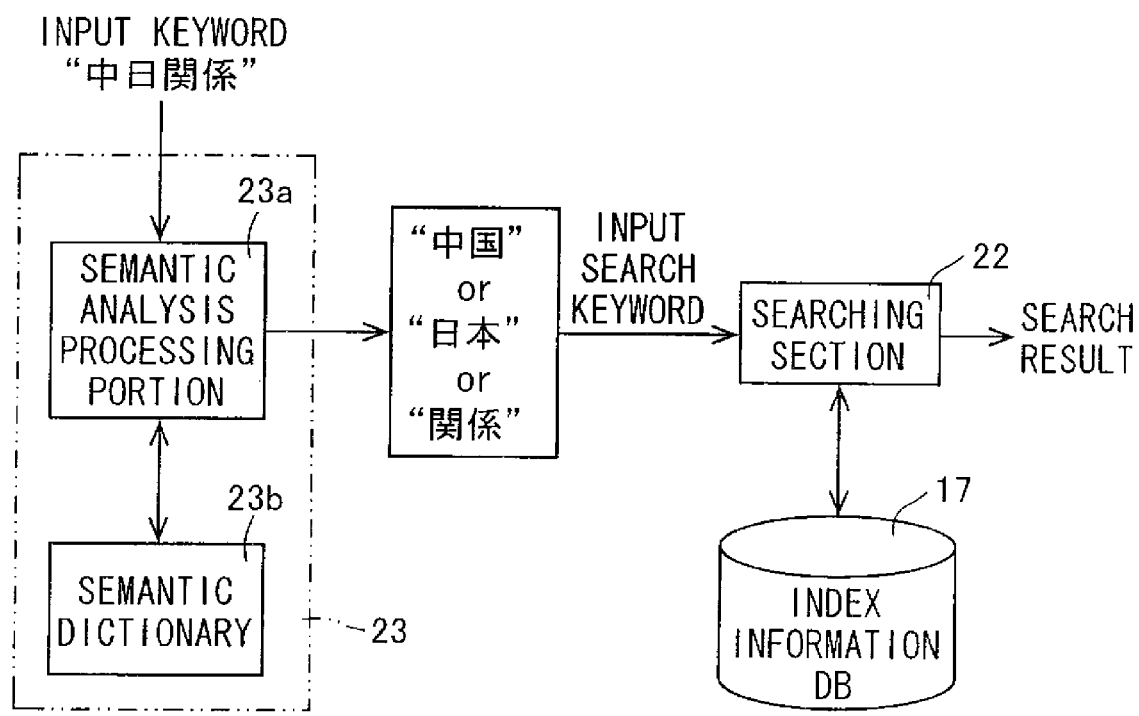
FIG. 20 is an illustration showing a search process provided with a lexical analysis function.

Subsequently, a description will be given to a search process having a lexical analysis function (a semantic analysis function). As also shown in FIG. 16, in the document image processing apparatus 10 of the present embodiment, a lexical analyzing section 23 is provided between the keyword inputting portion 24 and the searching section 22. FIG. 20 shows a search process provided with the lexical analysis function.

The lexical analyzing section 23 is constructed of a semantic analysis processing portion 23a and a semantic dictionary 23b. When a search keyword is inputted from the keyword inputting portion 24, the semantic analysis processing portion 23a analyzes the meaning of the search keyword in reference to the semantic dictionary 23b.

For example, when "中日関係" is inputted as the search keyword, the semantic analysis processing portion 23a inputs to the searching section 22 three words relating to "中日関係" namely "中国", "日本", and "関係". The words "中国", "日本", and "関係" are treated respectively, so that "中国" or "日本", or "関係" is targeted as a search formula.

When the search formula, namely "中国" or "日本", or "関係", is inputted to the searching section 22, the searching section 22 searches the index information DB 17 and extracts document images including "中国", document images including "日本", or document images including "関係".

By doing so, not only document images including the search keyword but also document images related to the search word can be retrieved.

Next, a description will be given to the document image managing section 57 which performs a document image managing process. The document image managing section 57 is constructed of the character image feature extracting portion 14, the character image feature dictionary 15, the feature similarity measurement portion 16, the heading region initial processing portion 18, the document image DB 19, the document image feature DB 20, the document name preparing portion 51, the document image DB managing portion 52, the document image displaying portion 53, and the instruction inputting portion 54. Hereinbelow, the constituent portions constituting the document image managing section 57 will be described.

The description have already made on the functions of the character image feature extracting portion 14, the character image feature dictionary 15, the feature similarity measurement portion 16, the heading region initial processing portion 18, the document image DB 19, and the document image feature DB 20. Here, a description will be only given accordingly to the additional functions required for performing the document image managing process. Specifically, the document image managing process refers to preparing a meaning document name so as to mange the document images in the document image feature DB 20.

Figure 21:
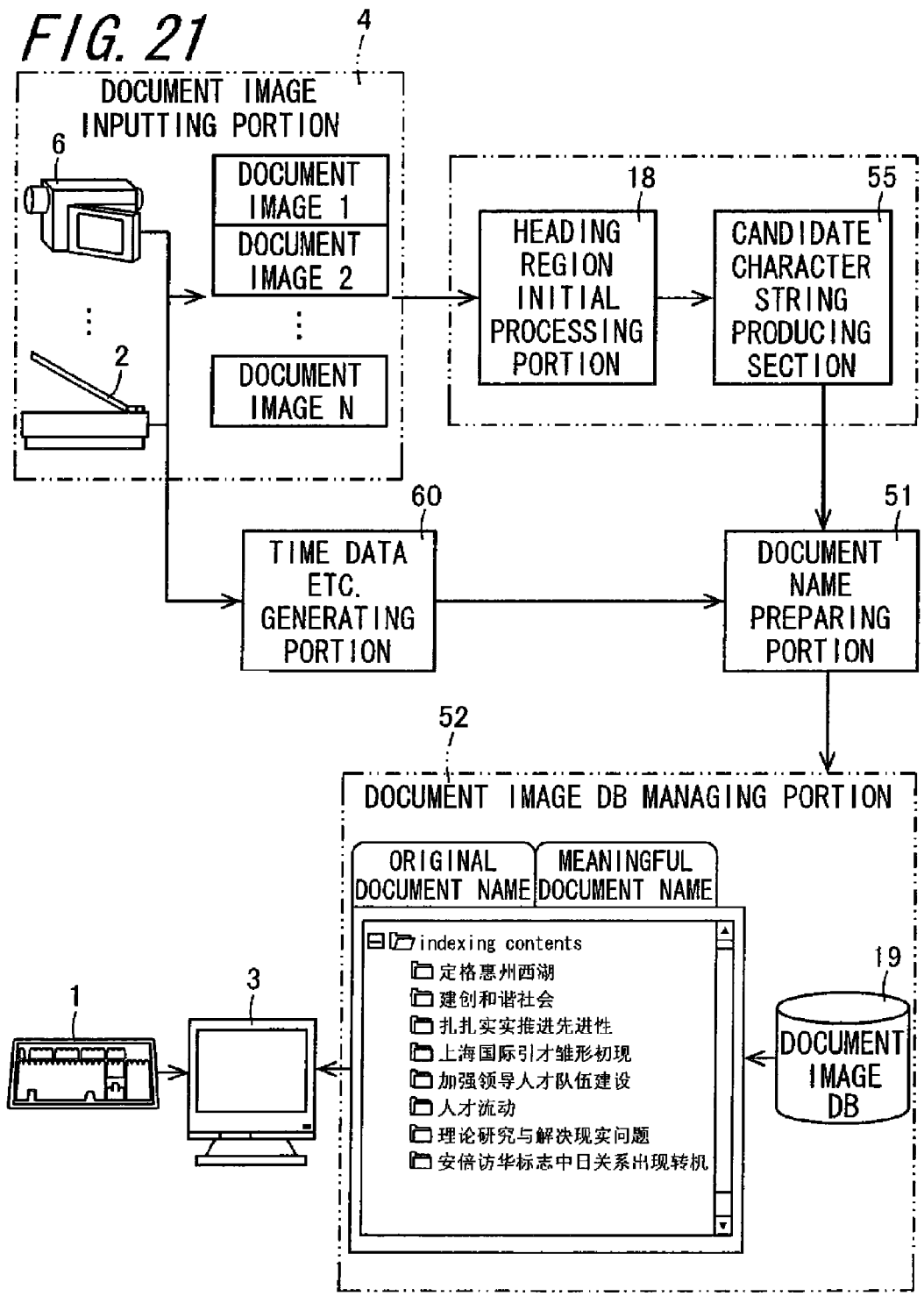
FIG. 21 is an illustration showing a process in a document image managing portion.

The document image managing process is described in reference to FIG. 21. The N pieces of document images, namely, the first document image through the N-th document image, are inputted from the document image inputting portion 21 which is constructed of the image scanner 2 or the digital photographic device 6.

The heading region initial processing portion 18 analyzes contents of the N pieces of respective document images thus inputted, and clips the heading regions to obtain character strings correspondingly. Next, although not illustrated in FIG. 21, the character image feature extracting portion 14, as mentioned above, divides the document images of the character strings included in the clipped heading regions into separated characters so as to extract image features of each of character images.

The candidate character string producing section 55 is constructed of the character image feature dictionary 15 and the feature similarity measurement portion 16. On the basis of the image features of images in the character strings clipped as has been described, the candidate character string producing section 55 selects characters having a high degree of similarity of image feature as candidate characters and prepares candidate character strings in accordance with the character strings included in the clipped heading regions. Simultaneously, the candidate character string producing section 55 adjusts the respective candidate characters constituting the candidate character strings by means of the lexical analysis method, so as to produce candidate character strings which make sense.

The candidate character strings which have been produced to make sense by the candidate character string producing section 55 as has been described, are sent to the document name preparing portion 51.

The document name preparing portion 51 prepares a document name of the inputted document image, which document name includes the candidate strings that have been produced to make sense by the candidate character string producing section 55. The document name including the candidate character string which makes sense, is referred to as "meaningful document name" hereinbelow.

Into the document name preparing portion 51, other data are also inputted that represent an input time and an input route of the document image, from the time data etc. generating portion 60. The document name preparing portion 51 also can produce a file name by use of the other data including at least the time data inputted from the time data etc. generating portion 60.

For example, of the other data such as the time data, the time data are included in a meaningful document name. The meaningful document name may be composed of the time data and the meaningful candidate character string.

Alternately, by use of the other data such as the time data, another document name may be prepared for the same document image. A document name composed of the other data such as the time data, is referred to as an original document name hereinbelow.

By composing the document names as have been described heretofore, it is possible to manage one document image by a meaningful document name and an original document name composed of the other data such as time data.

Meaningful document names and original document names produced corresponding to respective document images are sent to the document image DB managing portion 52, and are further stored in the document image DB 19, with responsive image data corresponding to the document names.

When a user gives an instruction of browsing a document image by use of an instruction inputting portion 54 shown is FIG. 2B, composed of the keyboard 1 and the like, the document image DB managing portion 52 displays a browsing screen on the document image displaying portion 53 shown in FIG. 2B, composed of the display apparatus 3 and the like.

FIG. 22 shows one example of browsing screens, displayed by the document image displaying portion 53, of the document image stored in the document image DB 19.

A screen 201 shown on the left side of FIG. 22 shows a state where stored document images are displayed by a list of original document names thereof. An entry order of the respective document images is shown above the screen 201. A hithermost document image referred to as "AR C262M 20060803 103140" on the drawing sheet, is the document image inputted in the first place. Figures "20060803" represent that the input date is "Aug. 3, 2006". Figures "103140" represent that the input time is "10:31:40".

In the display state as has been described heretofore, an operation such as selecting a tag of meaningful document name displayed on the screen, causes a display of browsing screen to jump to a screen 202 shown on the left side of FIG. 22. The screen 202 shows a state where the stored document images are displayed by a list of the document names thereof.

The screen 202 corresponds to the screen 201, and also in the upper part of the screen 202, the hithermost document image referred to as a meaningful document name of "定格惠州西湖" is the document image inputted in the first place.

In this way, the document images can be browsed in accordance with the meaningful document names, thus enabling a user to manage or search the stored document images with ease. Moreover, by preparing meaningful document names in conjunction with the original names, information such as time data and file names can be seen simultaneously.

Additionally, in the present document image processing apparatus 10, index information is prepared by use of the prepared index matrix. The index information is applied to the search process. For this reason, the heading region initial processing portion 18 clips a plurality of heading regions T included in document images and prepares index matrices for the respective heading regions T. However, if only aiming to prepare meaningful names for the document images, it is not necessary to clip the plurality of headlines included in the document images and prepare the index matrices for the respective clipped headlines.

That is, the document image processing apparatus may be so configured: preparing an index matrix for a character string of headline (character image string) included in a heading region which describes the document image the most aptly; and on the basis of this, employing a character string which is in similarity with the feature of the document image, to prepare a name which has a meaning.

The headline existing on the top row of the document image, for example, can be adopted as the heading region that describes the document image very aptly. This is due to that an important headline is inclined to be aligned on the top row of the document image correspondingly.

The size of the characters included in the heading region can be set to be greater than a certain size threshold and can be set to be greater than characters included in the other clipped heading regions. This is due to that compared to the other headlines, an important headline is inclined to be described in greater character size.

Alternately, the font type of the characters included in the heading region can be set different from those of the characters included in the other clipped heading regions. This is due to that an important headline is inclined to be described by characters having a font type different from that of characters included in the other headlines. Note that other standards other than the aforementioned ones can also be added. Further, the respective standards may be used either individually or in combination.

In addition, as in the case of the present document image processing apparatus 10, a document image processing apparatus may be constructed as to clip a plurality of heading regions from one document image and prepare index matrices for the respective heading regions thereof. In the constitution, the index matrix of the most important headline may be specified by the placement position of the heading region, the character size, or the character font. Moreover, particularly, being in this case, it is also preferable that a candidate character string be prepared so as to include a word which appears most frequently, based on the index matrices of the plurality of clipped heading regions.

As another embodiment of the invention, the index matrix may possibly be adjusted by using a multi-gram model instead of the bi-gram model.

Compared with the first embodiment of the invention, the present embodiment is only different in that the multi-gram model is employed. The other components are the same in both the embodiments, so detailed descriptions on the same components will be omitted.

Figure 23A:
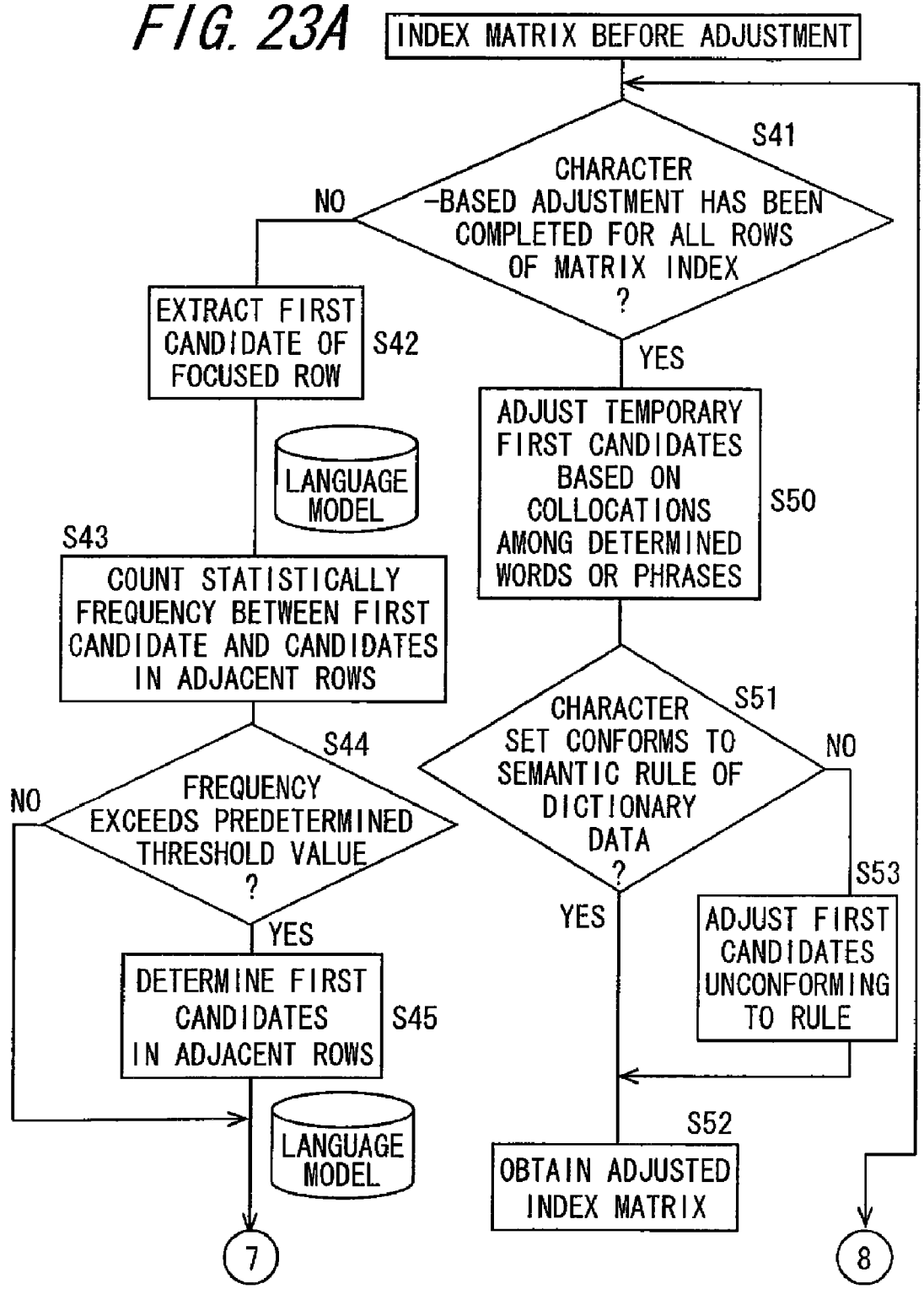

FIGS. 23A and 23B are flowcharts showing a method of adjusting the index matrix by using the multi-gram model.

In Step S41, it is determined whether or not the character-based adjustment has been completed for all the rows of the index matrix. When the adjustment has not been completed, the adjusting process goes to Step S42. Contrarily, when the adjustment has been completed, the adjusting process goes to Step S50.

In Step S42, the first candidate is extracted of the focused row, that is, the first row in the case of the first processing. In Step S43, by applying the multi-gram model, occurrence frequencies in the dictionary are counted statistically for respective combinations of the first candidate in the focused row and the respective candidates in a plurality of adjacent rows.

In Step S44, a comparison is made between the counted value and a predetermined threshold value. When the counted value is greater than the predetermined threshold value, the adjusting process goes to Step S45. Contrarily, when the counted value is less than the threshold value, the adjusting process goes to Step S46.

In Step S45, the first candidate of the adjacent row is determined, and the adjusting process goes to Step S46. In Step S46, by using the multi-gram model again, occurrence frequencies in the dictionary are counted statistically for the respective combinations of the candidate of the focused row and the respective candidates of a plurality of rows following the focused row.

In Step S47, it is determined whether or not the counted value is greater than a predetermined threshold value by making a comparison between the counted value and the predetermined threshold value. When the counted value is greater than the threshold value, the adjusting process goes to Step S48. In Step S48, the respective first candidates are determined of the plurality rows following the focused row. Contrarily, when the counted value is less than the threshold value, the adjusting process goes to Step S49 where the character showing the highest frequency is selected and the selected character is adopted as the first candidate temporally.

In Step S50, the temporary first candidates are determined on the basis of the collocations among the determined words or phrases. In Step S51, it is determined whether or not the character set in the first candidate character string conforms to the semantic rule of dictionary data. If the character set conforms to the semantic rule, the adjusting process goes to Step S52 and an adjusted index matrix is obtained. In this case, the adjusting process is completed. Contrarily, when the character set fails to conform to the semantic rule, the adjusting process goes to Step S53. In the step S53, the first candidates of the nonconforming rows are adjusted, and the adjusting process is completed.

As has been described heretofore, compared with the case of using the bi-gram model, a more accurate candidate character string can be prepared by applying the multi-gram model.

Finally, a hardware logic circuit may be used to constitute respective blocks of the document image processing apparatus 10, particularly the character style normalization processing portion 12, the character image feature extracting portion 14, the feature similarity measurement portion 16, the heading region initial processing portion 18, the searching section 22, the lexical analyzing section 23, the document name preparing portion 51, the document image DB managing portion 52, and the like. Moreover, the aforementioned blocks may be realized by software by use of CPU, which will be described as follows.

That is, the document image processing apparatus 10 is provided with a central processing unit (abbreviated as CPU) for implementing a control program direction for realizing all the functions, a read-only memory (abbreviated as ROM) where the aforementioned program is stored, a random access memory (abbreviated as RAM) for developing the aforementioned program, a storage device which stores memory for storing the aforementioned program and all types of data and the like, and the like devices. And then, the object of the present invention can be achieved also by the following process: providing a recording medium recorded computer-readably with program codes to the aforementioned document image processing apparatus 10; and reading out, by means of the computer (or CPU or MPU), the program codes recorded on the recording medium. The recording medium records computer-readably program codes (executable format program, intermediate code program, and source program) of the control program of the document image processing apparatus 10. The control program is software to realize the aforementioned functions.

The aforementioned recording medium may be, for example, selected from a group including a tape recording medium, a disk recording medium, a card recording medium, and a semiconductor memory recording medium. The tape recording medium includes a magnetic tape or a cassette tape. The disk recording medium includes a magnetic disk such as a floppy (registered trademark) disk or a hard disk, and an optical disk such as CD-ROM, MO, MD, DVD, or CD-R. The card recording medium includes an IC card (including memory card) and an optical card. The semiconductor memory recording medium includes mask ROM, EPROM, EEPROM, and flash ROM.

Further, the document image processing apparatus 10 may be so configured as to be connectable to communication network through which the aforementioned program codes can be provided. The communication network which is not particularly limited, may be selected, for example, from a group including Internet, intranet, extranet, LAN, ISDN, VAN, CATV communication network, virtual private network, telephone line network, mobile communication network, satellite communication network, and the like. A transmission medium is not particularly limited, which may be either wired or wireless. The wired medium includes IEEE1394, USB, power-line carrier, cable TV line, telephone line, ADSL line, and the like. The wireless medium includes IrDA or remote infrared light, Bluetooth (registered trademark), 802.11 wireless network, HDR, a cellular phone network, a satellite connection, digital terrestrial network, and the like. In addition, the present invention can be realized also by using computer data signal embedded in the carrier wave, which is realized by electronic transmission of the aforementioned program codes.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A document image processing apparatus including a processor, comprising:
    a character image feature dictionary;
    a character string clipping portion to clip character images in units of character string composed of a plurality of characters from an inputted document image;
    an image feature extracting portion to divide the character images in the character string clipped by the character string clipping portion, character by character, and to extract an image feature of the divided respective character images, as the resultant vector;
    a feature similarity measurement portion to select N (N>1, integer) pieces of character images in descending order of degree of similarity of image feature as candidate characters, from the character image feature dictionary which stores image features of character images in units of character based on the image features of each of the character images extracted by the image feature extracting portion, to prepare a first index matrix of M×N cells where M (M>1, integer) represents a number of characters in the clipped character string, and to prepare a second index matrix having a meaningful character string at a first column of the first index matrix, the meaningful character string being formed by adjusting a candidate character string by application of a lexical analysis using a predetermined language model to the candidate character string composed of a plurality of candidate characters constituting the first column of the first index matrix;
    an index information storing portion to store the second index matrix prepared by the feature similarity measurement portion, so as to correspond to the inputted document image; and
    a searching section to search, in a searching operation, the index information storing portion in units of search character constituting a search keyword of an inputted search formula, to take out the document image which includes the second index matrix containing the search character,
    wherein the feature similarity measurement portion adjusts, based on the lexical analysis, the candidate character string of the first column in the first index matrix into a meaningful candidate character string by replacing a candidate character in the first column by another candidate character in the same row in which the candidate character exists in the first index matrix.

2. The document image processing apparatus of claim 1, wherein the feature similarity measurement portion performs the lexical analysis on the candidate character strings by adopting a bi-gram or multi-gram model as a language model.

3. A tangible computer-readable recording medium storing a document image processing program that, when executed, causes a computer to at least:
    clip character images in units of character string composed of a plurality of characters from an inputted document image;
    divide the character images in the character string, character by character, and extract an image feature of the divided respective character images, as the resultant vector;
    select N (N>1, integer) pieces of character images in descending order of degree of similarity of image feature as candidate characters, from a character image feature dictionary which stores image features of character images in units of character based on the image features of each of the character images, prepare a first index matrix of M×N cells where M (M>1, integer) represents a number of characters in the clipped character string, and prepare a second index matrix having a meaningful character string at a first column of the first index matrix, the meaningful character string being formed by adjusting a candidate character string by application of a lexical analysis using a predetermined language model to the candidate character string composed of a plurality of candidate characters constituting the first column of the first index matrix;
    store the second index matrix, so as to correspond to the inputted document image;
    search, in a searching operation, an index information storing portion in units of search character constituting a search keyword of an inputted search formula, to take out the document image which includes the second index matrix containing the search character; and
    adjust, based on the lexical analysis, the candidate character string of the first column in the first index matrix into a meaningful candidate character string by replacing a candidate character in the first column by another candidate character in the same row in which the candidate character exists in the first index matrix.

* * * * *